US012267286B1

(12) United States Patent
Dani et al.

(10) Patent No.: US 12,267,286 B1
(45) Date of Patent: Apr. 1, 2025

(54) SHARING OF CONTENT

(71) Applicant: Amazon Technologies, Inc., Seattle, WA (US)

(72) Inventors: Neelesh Deo Dani, Vancouver (CA); Roopali Vasant Kaujalgi, Bothell, WA (US); Gerardo Montoya Velazquez, Seattle, WA (US); Micheal Arokiaraj Alexis Ponniah, Burnaby (CA); Qin Wang, San Mateo, CA (US); Christo Frank Devaraj, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 57 days.

(21) Appl. No.: 17/099,085

(22) Filed: Nov. 16, 2020

(51) Int. Cl.
| | |
|---|---|
| *G06F 15/16* | (2006.01) |
| *G06F 16/68* | (2019.01) |
| *G10L 15/18* | (2013.01) |
| *G10L 15/26* | (2006.01) |
| *H04L 51/043* | (2022.01) |
| *H04L 51/10* | (2022.01) |
| *H04L 51/52* | (2022.01) |

(52) U.S. Cl.
CPC .............. *H04L 51/10* (2013.01); *G06F 16/68* (2019.01); *G10L 15/1822* (2013.01); *G10L 15/26* (2013.01); *H04L 51/043* (2013.01); *H04L 51/52* (2022.05)

(58) Field of Classification Search
CPC ....... H04L 51/10; H04L 51/52; H04L 51/043; G06F 16/68; G10L 15/1822
See application file for complete search history.

(56) References Cited

U.S. PATENT DOCUMENTS

| | | | | |
|---|---|---|---|---|
| 7,565,327 | B2 * | 7/2009 | Schmelzer | G06F 16/433 380/54 |
| 7,765,263 | B1 * | 7/2010 | Alfke | H04L 51/066 709/205 |
| 9,858,244 | B1 * | 1/2018 | Bjorkegren | G06Q 30/00 |
| 10,083,160 | B1 * | 9/2018 | Yu | G06F 3/04855 |
| 10,133,816 | B1 * | 11/2018 | Bilinski | G06F 16/686 |
| 10,410,000 | B1 * | 9/2019 | Ghafourifar | G06F 21/10 |
| 10,599,758 | B1 * | 3/2020 | Yu | G06F 40/169 |
| 11,171,906 | B1 * | 11/2021 | Ledet | H04L 51/18 |
| 11,782,731 | B1 * | 10/2023 | Lin | G06F 9/485 709/219 |
| 2003/0126243 | A1 * | 7/2003 | Kudo | H04L 61/5038 709/228 |
| 2007/0055707 | A1 * | 3/2007 | Dandekar | G06F 9/44526 |
| 2011/0222112 | A1 * | 9/2011 | Yagiura | H04N 1/4413 358/1.15 |
| 2011/0222113 | A1 * | 9/2011 | Adachi | H04N 1/32128 358/1.15 |

(Continued)

*Primary Examiner* — Oleg Survillo
(74) *Attorney, Agent, or Firm* — Pierce Atwood LLP

(57) ABSTRACT

Techniques for accessing shared content based on a recipient's subscriptions are described. A recipient user may receive a notification that a sender user shared content. The recipient user may request to output the shared content. The system may determine which content providers the recipient user is subscribed to, and may perform entity resolution processing to identify potential content, from the subscribed content providers, corresponding to the shared content. The system may output the identified potential content in response to the request to output the shared content.

20 Claims, 10 Drawing Sheets

(56) References Cited

U.S. PATENT DOCUMENTS

| | | | | |
|---|---|---|---|---|
| 2014/0074846 | A1* | 3/2014 | Moss | H04L 65/60 |
| | | | | 707/740 |
| 2014/0195643 | A1* | 7/2014 | Liu | H04N 21/23109 |
| | | | | 709/217 |
| 2015/0195286 | A1* | 7/2015 | Doppler | H04L 67/125 |
| | | | | 726/4 |
| 2015/0310188 | A1* | 10/2015 | Ford | H04L 63/0428 |
| | | | | 726/28 |
| 2016/0021037 | A1* | 1/2016 | Hewitt | H04L 51/08 |
| | | | | 715/752 |
| 2016/0080475 | A1* | 3/2016 | Singh | G06F 9/5044 |
| | | | | 709/217 |
| 2016/0103652 | A1* | 4/2016 | Kuniansky | H04L 63/123 |
| | | | | 700/94 |
| 2017/0153694 | A1* | 6/2017 | Baldwin | G06F 1/3212 |
| 2017/0237729 | A1* | 8/2017 | Uppalapati | H04L 63/20 |
| | | | | 726/8 |
| 2018/0189505 | A1* | 7/2018 | Ghafourifar | G06F 21/6209 |
| 2018/0191651 | A1* | 7/2018 | Goldberg | H04L 51/08 |
| 2019/0238954 | A1* | 8/2019 | Dawson | H04N 1/00177 |
| 2019/0387034 | A1* | 12/2019 | Archer, III | H04L 51/18 |
| 2021/0160340 | A1* | 5/2021 | Narayanan | H04L 67/561 |
| 2022/0157320 | A1* | 5/2022 | Edwards | G10L 17/06 |
| 2022/0321569 | A1* | 10/2022 | Tan | H04L 63/108 |

* cited by examiner

SHARING OF CONTENT

BACKGROUND

Natural language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
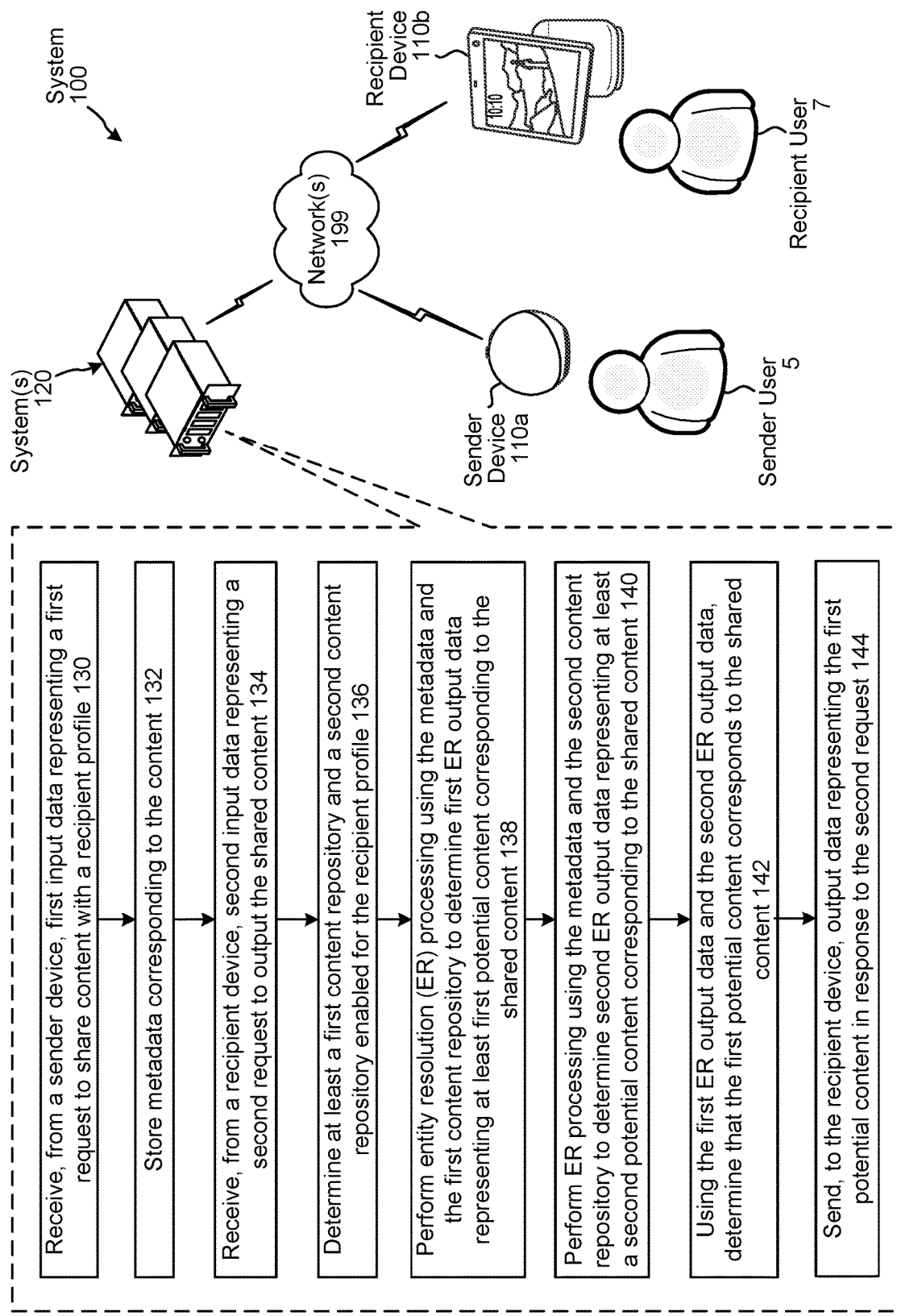
FIG. 1 is a conceptual diagram illustrating a system configured to output shared content at a recipient device, according to embodiments of the present disclosure.

Automatic speech recognition (ASR) is a field of computer science, artificial intelligence, and linguistics concerned with transforming audio data associated with speech into a token or textual representation of that speech. Natural language understanding (NLU) is a field of computer science, artificial intelligence, and linguistics concerned with enabling computers to derive meaning from natural language inputs (such as spoken inputs). ASR and NLU are often referred to collectively as spoken language understanding (SLU). Text-to-speech (TTS) is a field of computer science concerning transforming textual and/or other data into audio data that is synthesized to resemble human speech.

A system may be configured to perform actions responsive to user inputs. For example, for the user input "play music by [artist name]," the system may output music sung by the indicated artist. For further example, for the user input "tell me the recipe for meatballs" the system may display a recipe for meatballs and/or may output synthesized speech representing the recipe for meatballs. In another example, for the user input "show me cat videos," the system may output videos of cats.

The present disclosure relates to techniques for enabling a user/sender to share content (e.g., music, TV shows, movies, videos, news briefings, recipes, photos, images, social media content, magazines, articles, books, etc.) with another user/recipient, and enabling the recipient to have the shared content output based on the enabled/available content providers/repositories for the recipient and content settings indicated by the recipient. Different users may enable/subscribe to different content providers (e.g., different music providers, different video providers, different TV/movie providers, different recipe providers, different social media platforms, different photo/image providers, etc.), and for each content provider different users may have different levels of access. Based on the content provider and the access level, different users may have access to different content stored in a content repository. For example, a first user may subscribe to a music provider at an "unlimited" access level and may be able to access/play a first song, while a second user may subscribe to the music provider at a "limited" access level and may not be able to access/play the same first song. The present disclosure enables the sender to share content with the recipient without having knowledge of the recipient's accessible content and content settings.

In some embodiments, the system of the present disclosure determines which content the recipient has access to, based on the recipient's content provider subscriptions and access levels, and determines whether the shared content is accessible by the recipient. The system receives metadata corresponding to the shared content, where the metadata may include information identifying the shared content, and processes the metadata to identify content, from one or more content repositories accessible by the recipient and satisfying any content settings indicated by the recipient, that potentially matches or otherwise represents the shared content. In some embodiments, the system performs entity resolution processing using the metadata and the content repository to identify content that corresponds to the shared content.

When the recipient requests the system to output the shared content, the system outputs content from one of the content providers the recipient is subscribed to. If the shared content is not available via one of the content providers the recipient subscribes to, then the system may output a message saying that the shared content is not available for playback for the recipient. In some embodiments, the system may offer to play content that is similar or related to the shared content. In some embodiments, the system may offer to play a station (a collection of content) that is similar to or related to (e.g., of the same genre, by the same artist/author, etc.) the shared content.

For example, a sender may be listening to a song by an artist, and may say "Alexa, share this song with [recipient]." The system receives metadata including, for example, the song title, the artist name, and the album name, and sends a notification to the recipient (via a recipient's device) indicating that the sender has shared a song. In response to receiving the notification, the recipient may say "play the song." The system determines that the recipient has access to a first music provider and a second music provider, and performs entity resolution using the metadata corresponding to the shared song and the repository for the first music provider to determine at least a first song that potentially corresponds to the shared song (e.g., based on the song title, the artist name, and/or the album name). The system also performs entity resolution using the metadata and the repository for the second music provider to determine at least a second song that potentially corresponds to the shared song. The system then chooses between the first and second songs, and outputs the chosen song in response to the recipient's request to play the shared song.

In some embodiments, the system may determine that the recipient has access to the same piece of content as the sender, e.g., the recipient subscribes to the same content provider and has same access rights as the sender. In this example and/or in other embodiments, the system may receive a content identifier associated with the shared content (instead of or in addition to metadata about the content), and use the content identifier to output the piece of content that was shared.

In some embodiments, the system determines which content to output, in response to the recipient's request to output the shared content, based on user profile settings, user account settings, device settings, recipient location data, and/or other factors. For example, the user profile settings and/or the user account settings for the recipient, and/or the device settings, may indicate that an explicit content filter is enabled (i.e., only non-explicit content is allowed to be played for the recipient or the device). In this case, if the sender shares a song with explicit content, the system may identify a non-explicit/clean version of the shared song and may output that in response to the recipient's request to play the shared song. In another example, one or more types of devices may be unable to output content provided by a particular content provider, and the system may identify content from only those content providers that are enabled for the type of device the recipient is using.

In some embodiments, the recipient receives a notification (e.g., a displayed icon/text on the recipient's device (e.g., a push notification), a visual notification (e.g., a light ring) at the recipient's device, a message, etc.) when the sender shares content with the recipient. The recipient may request the system to output the notification, in response to which the system may output text or synthesized speech "[Sender] shared [song]. Would you like to hear it now?" The recipient may say "yes" or select "yes" on the device, which causes the system to output content. In this manner, the recipient can access the shared content directly from the notification and without having to start another dialog with the system.

The sender can share content such as a single song, a playlist of songs, an album, a station, a single video, a playlist of videos, a single show episode, a show season, a single recipe, a group of recipes, a single news briefing, a group of news briefings, and other playable content that can be identified using a content identifier or metadata such as title, artist/author name, album/show name, etc.

Teachings of the present disclosure, among other things, improve the user experience by enabling a sender to share content without knowledge of a recipient's available content. The recipient's experience is also improved as the system enables output of shared content based on the recipient's enabled skills/content repositories and content settings without the recipient needing to determine how to output the shared content. The system also provides the recipient with other options when the shared content is not available via the recipient's accessible content. The present disclosure further improves the recipient's experience by enabling the recipient to access the shared content via a notification.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 shows a system 100 configured to output shared content at a recipient device based on content repositories accessible by a recipient profile. Although the figures and discussion of the present disclosure illustrate certain steps in a particular order, the described steps may be performed in a different order (as well as certain steps removed or added) without departing from the present disclosure. As shown in FIG. 1, the system 100 may include a sender device 110a (local to a sender user 5) and a recipient device 110b (local to a recipient user 7) both in communication with a system 120 across a network(s) 199. The network(s) 199 may include a local-area network(s) (LAN(s)), a wireless local-area network(s) (WLAN(s)), a Metropolitan Area Network(s), a Wide Area Network(s), a Campus Area Network(s), a mobile carrier system(s), and/or the like.

Although the figures and discussion illustrate the steps being performed by the system(s) 120, some of the described steps may be performed by the sender device 110a and some of the described steps may be performed by the recipient device 110b.

In some cases, the sender user 5 may be listening to or viewing content outputted by the sender device 110a, and may want to share it with the recipient user 7. In other cases, the sender device 110a may be outputting information on content (e.g., displaying information representing the song, such as song title, artist, album cover, etc.; outputting synthesized speech representing information about the song, such as, "next in the playlist is [song title] by [artist]"), and the sender user 5 may want to share the content with the recipient user 7. The system(s) 120 receives (130), from the sender device 110a, first input data representing a first request to share content with a recipient profile associated with the recipient user 7. In some embodiments, the sender user 5 may provide a spoken natural language input representing the request, for example "Alexa, share this song with [recipient]." In this case, the first input data may be audio data representing the spoken natural language input. The system(s) 120 may perform ASR processing and NLU processing (or SLU processing) using the audio data (the first input data) to determine the first request to share the content with the recipient user 7. In some embodiments, the sender user 5 may provide a tactile input via the sender device 110a, for example, by selecting one or more icons, buttons, etc. via a touchscreen interface of the sender device 110a, by providing a mouse click and/or keyboard input via a mouse and/or keyboard of the sender device 110a, etc. In this case, the first input data may represent the input(s) received via one or more peripherals of the sender device 110a, and the system(s) 120 may determine that the received input(s) represents the first request to share the content with the recipient user 7. For example, the sender user 5 may select a "share" button associated with content information displayed via the sender device 110*a*, and then may select displayed information representing the recipient user 7. In some embodiments, the sender user 5 may provide other types of inputs, such as a gesture(s), the first input data may be image data representing the gesture(s), and the system(s) 120 may process the image data to determine the first request. The system(s) 120 may identify the recipient user 7 using contact data associated with a sender profile of the sender user 5.

The system(s) 120 stores (132) metadata corresponding to the content that the sender user 5 wants to share. In some embodiments, the system(s) 120 may associate the metadata with a communications session identifier that may be used by the system(s) 120 to track the share request from the sender user 5 to the recipient user 7. The communications session identifier may be used to track when the sender user 5 shared the content with the recipient user 7, when the recipient user 7 outputted/viewed/accessed the shared content, any feedback/reactions the recipient user 7 provides in response to the shared content, etc. The communications session identifier may also be associated with context information corresponding to the sender user 5, the sender device 110*a*, the recipient user 7, and the recipient device 110*b*.

In some embodiments, the metadata corresponding to the content may represent information that can be used to identify the shared content. For example, if the shared content is a song, the metadata may include a song title, an artist, an album name, a record label, a release year, etc. In some embodiments, the metadata may also include a content identifier associated with the shared content. In some embodiments, the content identifier may identify the shared content within a particular content repository (associated with a particular content provider skill), where the particular content repository may be the content repository being used by the sender user 5 to access the content. For example, the sender user 5 may be using a first music repository (e.g., provided by a first music skill) to access a song, the first music repository may use a first schema to identify the songs/content accessible via the first music repository, and the content identifier may be used by the first music repository. The same song may be associated with a different content identifier in a different music repository based on the schema used by that music repository and music provider skill.

After the sender user 5 provides the first request, the system(s) 120 may determine when and how to inform the recipient user 7 that the sender user 5 has shared content. In some embodiments, the system(s) 120 may provide a notification to one or more devices (e.g., collectively illustrated as the recipient device 110*b* in FIG. 1) associated with a user profile identifier of the recipient user 7. Depending on the capabilities and settings of the recipient device 110*b*, the notification may be outputted to the recipient user 7 in different ways. For example, the notification may be a pop-up message displayed at the recipient device 110*b*, and the recipient device 110*b* may also output a sound indicating to the recipient user 7 that the recipient user 7 has a notification. In another example, the recipient device 110*b* may output a visual indication, such as a light ring, a blinking light, etc., indicating to the recipient user 7 that the recipient user 7 has a notification. In some embodiments, the recipient user 7 may request the system(s) 120 to output the notification(s). In some embodiments, the system(s) 120 may send a short message service (SMS) message, a multimedia messaging service (MMS) message, a text message, an email, a voice message, or other type of message informing the recipient user 5 that the sender user 5 shared content.

In some embodiments, the system(s) 120 may determine to send the notification/message to the recipient device 110*b* immediately after or soon after the first request is received. In some embodiments, the system(s) 120 may wait to send the notification/message to the recipient device 110*b*. For example, the system(s) 120 may wait to send the notification/message until the recipient user's 7 presence is detected at the recipient device 110*b*. In another example, the system(s) 120 may wait to send the notification/message to the recipient device 110*b* until the recipient user 7 interacts with the recipient device 110*b*. In yet another example, the system(s) 120 may wait to send the notification/message to the recipient device 110*b* until the recipient user 7 finishes a presently active interaction/session with device 110*b*. In this case, the system(s) 120 does not interrupt an on-going interaction between the recipient user 7 and the recipient device 110*b*. In some embodiments, the recipient device 110*b* may be set to a do-not-disturb mode, and the system(s) 120 may wait to send the notification/message until the recipient device 110*b* is no longer in the do-not-disturb mode.

In some embodiments, the system(s) 120 may send the notification/message to the recipient device 110*b* to be output as injected content or supplementary content during an interaction between the recipient user 7 and the recipient device 110*b*. For example, the recipient device 110*b* may be outputting music in response to a request from the recipient user 7, and after a song (or an album, playlist, etc.) is finished playing, the system(s) 120 may send the notification/message to the recipient device 110*b* indicating to the recipient user 7 that the sender user 5 shared a song. In another example, the recipient user 7 may request the device 110*b* to play music, and the system(s) 120 may send the notification/message to the recipient device 110*b* indicating to the recipient user 7 that the sender 5 shared a song. In another example, the recipient user 7 may have provided a request/command to the recipient device 110*b*, and once the recipient device 110*b* finishes outputting a response to the request command, the system(s) 120 may send the notification/message to the recipient device 110*b* for output.

The notification/message may be outputted by the recipient device 110*b* as text displayed at the recipient device 110*b* or as synthesized speech. The notification/message may include the name of the sender user 5, and an option for the recipient user 7 to output the shared content. In some embodiments, the notification/message may also include information about the shared content. The notification/message may be, for example, "[sender] shared a song with you. Would you like to hear it?", "[sender] shared the song [title]. Should I play it for you now?", or "[sender] shared a song by [artist]. Click here to listen."

In response to the notification/message outputted at the recipient device 110*b*, the recipient user 7 may provide an input indicating a request to output the shared content. The system(s) 120 receives (134), from the recipient device 110*b*, second input data representing a second request to output the shared content. The recipient user 7 may provide a spoken natural language input (e.g., the recipient user 7 may say "yes" or "yes play the song"), in which case, the second input data may be audio data representing the spoken natural language input. The system(s) 120 may perform ASR processing and NLU processing (or SLU processing) using the second input data to determine the second request from the recipient user 7 to output the shared content. In some embodiments, the recipient user 7 may provide a tactile input via the recipient device 110b, for example, by selecting one or more icons, buttons, etc. via a touchscreen interface of the recipient device 110b, by providing a mouse click and/or keyboard input via a mouse and keyboard of the recipient device 110b, etc. In this case, the second input data may represent the input received via peripherals of the recipient device 110b, and the system(s) 120 may determine that the received input represents the second request to output the shared content. For example, the recipient user 5 may select a "yes" button associated with the notification/message. In some embodiments, the recipient user 7 may provide other types of inputs, such as a gesture(s), the second input data may be image data representing the gesture(s), and the system(s) 120 may process the image data to determine the second request.

The system(s) 120 determines (136) at least a first content repository and a second content repository are accessible by the recipient profile of the recipient user 7. Different users may be subscribed to different content provider skills and different access levels within the content provider skills. Based on the subscription and access level/rights, the recipient user 7 may be able to access contents from the first content repository and the second content repository. A content repository, in some embodiments, may be associated with a particular content provider skill. In some embodiments, a content repository may include content stored/downloaded at the device 110b or stored/uploaded in the cloud for the recipient profile of the recipient user 7. In some embodiments, the recipient user 7 may have enabled a particular content repository for the specific device 110b. In some embodiments, the content repository may include individual content (songs, albums, playlists, etc.) purchased by the recipient user 7. In some embodiments, the system(s) 120 may determine the first content repository and the second content repository based on information associated with the user profile identifier of the recipient user 7. In some embodiments, the system(s) 120 may also or alternatively determine the first content repository and the second content repository based on device information associated with the recipient device 110b (e.g., some music providers skills are not available for certain device types/manufacturers). In some embodiments, some or all of the first and second content repository may be stored at the recipient device 110b. In some embodiments, some or all of the first and second content repository may be stored at an external system/data storage (e.g., content repository 290).

The system(s) 120 performs (138) entity resolution (ER) processing using the metadata and the first content repository to determine first ER output data representing at least first content potentially corresponding to the shared content. The system(s) 120 may determine, based on the metadata (e.g., song title, artist, album name, record label, release year, etc.) that the first potential content in the first content repository is similar to or matches the shared content. In some embodiments, the first ER output data may include a list of potential content, from the first content repository, corresponding to the shared content. In some embodiments, the first ER output data may include, for each of the potential content, a confidence score indicating a likelihood/probability of the potential content corresponding to the shared content. In some embodiments, the first ER output data may also include a content identifier associated with each of the potential content.

The system(s) 120 performs (140) ER processing using the metadata and the second content repository to determine second ER output data representing at least second content potentially corresponding to the shared content. The system(s) 120 may determine, based on the metadata (e.g., song title, artist, album name, record label, release year, etc.) that the second potential content in the second music repository is similar to or matches the shared content. In some embodiments, the second ER output data may include a list of potential content, from the second content repository, corresponding to the shared content. In some embodiments, the second ER output data may include, for each of the potential content, a confidence score indicating a likelihood/probability of the potential content corresponding to the shared content. In some embodiments, the second ER output data may also include a content identifier associated with each of the potential content.

The system(s) 120, using the first ER output data and the second ER output data, determines (142) that the first potential content corresponds to the shared content. content In some embodiments, the system(s) 120 may select the first potential song, from among the list of potential content from the first content repository and the list of potential content from the second content repository, based on a confidence score associated with the first potential content (e.g., the first potential song may have the highest confidence score compared to the other potential songs). In some embodiments, the system(s) 120 may select the first potential content based on the settings and capabilities of the recipient device 110b, based on user profile settings, user account settings, user profile data, user preferences, historic user interaction data, user feedback to content outputted in the past, etc. corresponding to the recipient user 7, based on context information corresponding to the second request (e.g., time when the second request is received, location of the recipient user 7/device 110b, presence of other users, any background content being outputted/processed by the recipient device 110b, etc.).

The system(s) 120 sends (144), to the recipient device 110b, output data representing the first potential content in response to the second request. The system(s) 120 may use the content identifier associated with the first potential content to receive the output data from the first content repository (in some embodiments, via the content provider skill associated with the first content repository).

In some embodiments, the system(s) 120 may determine that explicit content settings are associated with the recipient device 110b, the user account associated with the recipient user 7, and/or user profile data associated with the recipient user 7. If the explicit content settings indicate that the recipient 7 or the recipient device 110b is to only play non-explicit content, then the system(s) 120 may output a non-explicit/clean version corresponding to the shared content. In some embodiments, the system(s) 120, at steps 138 and 140, may only perform ER processing with respect to non-explicit/clean versions of potential content in the first and second content repositories. In other embodiments, the first ER output data and the second ER output data may include explicit and non-explicit content corresponding to the shared content, and the system(s) 120, at step 142, may select the first potential content because it is a non-explicit version.

In some embodiments, the system(s) 120 may not be able to find a potential content, from the enabled music repositories for the recipient user 7, corresponding to the shared content. In this case, the system(s) 120 may output, to the recipient user 7 via the recipient device 110b, a message (e.g., displayed text or synthesized speech) indicating that the shared content is not available for output for the recipient user 7. In some embodiments, the system(s) 120 may also output a prompt (e.g., displayed text or synthesized speech) offering to play another song that is related to the shared song or a "station" that is related to the shared song. The other song may be determined based on the artist, album, genre or other information being similar to/the same as the shared song. A "station" may be a collection of songs, a playlist, a radio station, or the like, that may be available to the recipient user 7. The station may be publicly available or may be generally available to users of the system(s) 120 without requiring a subscription. In some embodiments, the recipient user 7 may have to enable output of music via stations. The system(s) 120 may determine the station based on the artist, album, genre or other information of the shared song. For example, the station may play songs of the same/similar genre as the shared song, may play songs by the same/similar artists as the shared song, etc.

In some embodiments, the system(s) 120 may identify the recipient user 7 based on the second input data to determine that the shared content is intended for the recipient user 7. If the second request is a spoken input, then the system(s) 120 may use user recognition techniques described below to identify the recipient user 7 using the audio data.

In some embodiments, the system(s) 120 may only perform ER processing using the first content repository if the recipient profile of the recipient user 7 indicates that the first content repository is a preferred/default content repository for the recipient user 7. The system(s) 120 may perform ER processing with respect to the second content repository only if content potentially matching/similar to/substantially similar to the shared content cannot be identified in the first content repository.

As used herein, a "skill" may refer to software, that may be placed on a machine or a virtual machine (e.g., software that may be launched in a virtual instance when called), configured to perform one or more actions in response to user inputs (such as spoken natural language inputs). For example, for the spoken natural language input "play music by <artist>," a skill may output music sung by the indicated artist. For further example, for the spoken natural language input "turn on the lights," a skill may cause one or more "smart" lights to operate in an "on" state. In another example, for the spoken natural language input "what is the weather," a skill may output weather information for a geographic location corresponding to the device that captured the spoken natural language input. What is described herein as a skill may be referred to using different terms, such as an application, a processing component, a content/music service provider, a content/music provider, or the like.

Figure 2:
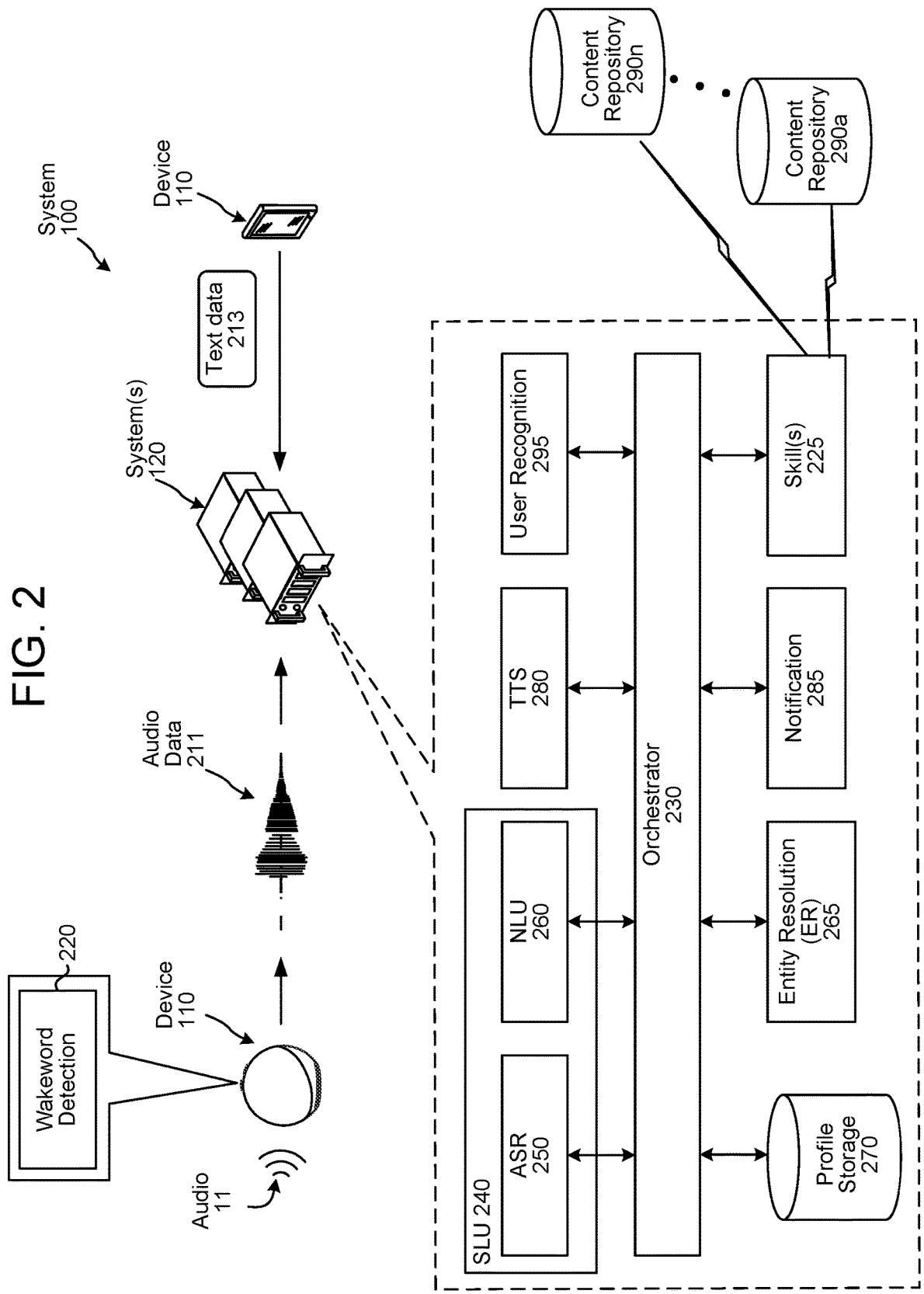
FIG. 2 is a conceptual diagram of components of a system, according to embodiments of the present disclosure.

The system 100 may operate using various components as illustrated in FIG. 2. The various components may be located on a same or different physical devices. Communication between various components may occur directly or across a network(s) 199.

A microphone or array of microphones (of or otherwise associated with the speech controllable device 110) may capture audio 11. The speech controllable device 110 processes audio data, representing the audio 11, to determine whether speech is detected. The speech controllable device 110 may use various techniques to determine whether audio data includes speech. In some examples, the speech controllable device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the speech controllable device 110 may implement a classifier configured to distinguish speech from background noise. The classifier may be implemented by techniques such as linear classifiers, support vector machines, and decision trees. In still other examples, the speech controllable device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the speech controllable device 110 may determine if the speech is directed at the speech controllable device 110/system 120. In at least some embodiments, such determination may be made using a wakeword detection component 220. The wakeword detection component 220 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the speech controllable device 110 may "wake" and begin transmitting audio data 211, representing the audio 11, to the system 120. The audio data 211 may include data corresponding to the detected wakeword, or the speech controllable device 110 may remove the portion of the audio corresponding to the detected wakeword prior to sending the audio data 211 to the system 120.

The system 120 may include an orchestrator component 230 configured to, among other things, coordinate data transmissions between components of the system 120. The orchestrator component 230 may receive the audio data 211 from the speech controllable device 110, and send the audio data 211 to an ASR component 250.

The ASR component 250 transcribes the audio data 211 into ASR output data including one or more ASR hypotheses. An ASR hypothesis may be configured as a textual interpretation of the speech, or may be configured in another manner, such as one or more tokens. Each ASR hypothesis may represent a different likely interpretation of the speech in the audio data 211. Each ASR hypothesis may be associated with a score representing a confidence of ASR processing performed to determine the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

In at least some instances, instead of the speech controllable device 110 receiving audio 11, the speech controllable device 110 may receive a text-based (e.g., typed) natural language input. The speech controllable device 110 may determine text data 213 representing the typed natural language input, and may send the text data 213 to the system 120, wherein the text data 213 is received by the orchestrator component 230. The orchestrator component 230 may send the text data 213 or ASR output data output, depending on the type of natural language input received, to a NLU component 260.

The NLU component 260 processes the ASR output data or text data to determine one or more NLU hypotheses embodied in NLU output data. The NLU component 260 may perform intent classification (IC) processing on the ASR output data or text data to determine an intent of the natural language user input. An intent corresponds to an action to be performed that is responsive to the natural language user input. To perform IC processing, the NLU component 260 may communicate with a database of words linked to intents. For example, a music intent database may link words and phrases such as "quiet," "volume off," and "mute" to a <Mute> intent. The NLU component 260 identifies potential intents by comparing words and phrases in ASR output data or text data to the words and phrases in an intents database. In at least some embodiments, the NLU component 260 may communicate with multiple intents databases, with each intents database corresponding to one or more intents associated with a particular skill.

For example, IC processing of the natural language user input "play my workout playlist" may determine an intent of <PlayMusic>. For further example, IC processing of the natural language user input "call mom" may determine an intent of <Call>. In another example, IC processing of the natural language user input "call mom using video" may determine an intent of <VideoCall>. In yet another example, IC processing of the natural language user input "what is today's weather" may determine an intent of <OutputWeather>.

The NLU component 260 may also perform named entity recognition (NER) processing on the ASR output data or text data to determine one or more portions (which may be referred to as one or more slots) of the natural language user input that may be needed for post-NLU processing (e.g., processing performed by a skill). For example, NER processing of the natural language user input "play [song name]" may determine a slot corresponding to "SongName: [song name]." For further example, NER processing of the natural language user input "call mom" may determine a slot corresponding to "Recipient: Mom." In another example, NER processing of the natural language user input "what is today's weather" may determine a slot corresponding to "Date: Today."

In at least some embodiments, the intents identifiable by the NLU component 260 may be linked to one or more grammar frameworks with "slots" to be filled. Each slot of a grammar framework corresponds to a portion of ASR output data or text data that the NLU component 260 believes corresponds to an entity. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 260 may perform NER processing to identify words in ASR output data or text data as subject, object, verb, preposition, etc. based on grammar rules and/or models. Then, the NLU component 260 may perform IC processing that involves using the identified verb to identify an intent. Thereafter, the NLU component 260 may again perform NER processing to determine a grammar model associated with the identified intent. For example, a grammar model for a <PlayMusic> intent may specify a list of slots applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRF), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 260 may generate NLU output data including one or more NLU hypotheses, with each NLU hypothesis including the intent and slot(s) determined from IC processing and NER processing of the ASR output data or text data. In at least some embodiments, the NLU component 260 may perform IC processing and NLU processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 250 and the NLU component 260). In at least some embodiments, the system 120 may implement a spoken language understanding (SLU) component 255 configured to process audio data 211 to determine NLU output data.

The SLU component 255 may be equivalent to a combination of the ASR component 250 and the NLU component 260. Yet, the SLU component 255 may process audio data 211 and directly determine the NLU output data, without an intermediate step of generating ASR output data. As such, the SLU component 255 may take audio data 211 representing speech and attempt to make a semantic interpretation of the speech. That is, the SLU component 255 may determine a meaning associated with the speech and then implement that meaning. For example, the SLU component 255 may interpret audio data 211 representing speech from the user 5 in order to derive a desired action. The SLU component 255 may output a most likely NLU hypothesis, or multiple NLU hypotheses associated with respective confidence or other scores (such as probability scores, etc.).

The NLU component 260 (or the SLU component 255 depending on configuration of the system 120) may send the NLU output data to the orchestrator component 230. The orchestrator component 230 may send the NLU output data to a skill.

The system 120 may include or otherwise communicate with one or more skills 225. As mentioned herein above, as used herein a "skill" may refer to software, that may be placed on a machine or a virtual machine (e.g., software that may be launched in a virtual instance when called), configured to perform one or more actions in response to user inputs (such as spoken natural language inputs). For example, for the spoken natural language input "play music by <artist>," a skill 225 may output music sung by the indicated artist. For further example, for the spoken natural language input "turn on the lights," a skill 225 may cause one or more "smart" lights to operate in an "on" state. In another example, for the spoken natural language input "what is the weather," a skill 225 may output weather information for a geographic location corresponding to the device that captured the spoken natural language input. What is described herein as a skill 225 may be referred to using different terms, such as an action, bot, application, or the like. Inputs to a skill 225 may come from speech processing interactions or through other interactions or input sources.

A skill 225 may be associated with a domain, a non-limiting list of which includes a smart home domain, a music domain, a video domain, a weather domain, a communications domain, a flash briefing domain, a shopping domain, and a custom domain.

The system 120 may include a TTS component 280 that determine audio data (e.g., synthesized speech) from text data using one or more different methods. Text data input to the TTS component 280 may come from a skill, the orchestrator component 230, or another component of the system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to determine audio data including an artificial speech waveform. Parametric synthesis uses a computerized voice generator, sometimes called a vocoder.

The system 120 may include a user recognition component 295. The user recognition component 295 may recognize one or more users using various data. The user recognition component 295 may take as input the audio data 211. The user recognition component 295 may perform user recognition by comparing speech characteristics, in the audio data 211, to stored speech characteristics of users (e.g., stored speech characteristics associated with user profile identifiers associated with the speech controllable device 110 that determined the audio data 211). The user recognition component 295 may additionally or alternatively perform user recognition by comparing biometric data (e.g., fingerprint data, iris data, retina data, etc.), received by the system 120 in correlation with a natural language input, to stored biometric data of users (e.g., stored biometric data associated with user profile identifiers associated with the speech controllable device 110 that determined the audio data 211 or otherwise captured a user input). The user recognition component 295 may additionally or alternatively perform user recognition by comparing image data (e.g., including a representation of at least a feature of a user), received by the system 120 in correlation with a natural language input, with stored image data including representations of features of different users (e.g., stored image data associated with user profile identifiers associated with the speech controllable device 110 that determined the audio data 211 or otherwise captured a user input). The user recognition component 295 may perform other or additional user recognition processes, including those known in the art. For a particular user input, the user recognition component 295 may perform processing with respect to stored data of users associated with the speech controllable device 110 that captured the user input.

The user recognition component 295 determines whether a user input originated from a particular user. For example, the user recognition component 295 may determine a first value representing a likelihood that a user input originated from a first user, a second value representing a likelihood that user input originated from a second user, etc. The user recognition component 295 may also determine an overall confidence regarding the accuracy of user recognition processing.

The user recognition component 295 may output a single user profile identifier corresponding to the most likely user that originated the user input. Alternatively, the user recognition component 295 may output multiple user profile identifiers (e.g., in the form of an N-best list) with respective values representing likelihoods of respective users originating the user input. The output of the user recognition component 295 may be used to inform NLU processing, processing performed by a skill, as well as processing performed by other components of the system 120 and/or other systems.

The system 120 may include profile storage 270. The profile storage 270 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data.

The profile storage 270 may include one or more user profiles. Each user profile may be associated with a different user profile identifier. Each user profile may include various user identifying data. Each user profile may also include preferences of the user. Each user profile may include one or more device identifiers, representing one or more devices registered to the user. Each user profile may include identifiers of skills that the user has enabled. When a user enables a skill, the user is providing the system 120 with permission to allow the skill to execute with respect to the user's natural language inputs. If a user does not enable a skill, the system 120 may not invoke the skill to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 270 may include one or more device profiles. Each device profile may be associated with a different device identifier/device profile identifier. A device profile may include various device identifying data, input/output characteristics, networking characteristics, etc. A device profile may also include one or more user profile identifiers, corresponding to one or more user profiles associated with the device profile. For example, a household device's profile may include the user profile identifiers of users of the household.

The system(s) 120 may include an entity resolution (ER) component 265 that is configured to perform entity resolution (ER) processing. As used herein, ER processing may refer to the task of disambiguating records, within datasets, that correspond to real world entities, using some information identifying the entity. The ER component 265 may receive data (e.g., entity type) identifying one or more entities, and may output data representing one or more entities corresponding to the identified entity type. In some embodiments, the ER component 265 may receive semantically tagged data.

In some embodiments, the ER component 265 may be configured to perform ER processing with respect to content repositories (e.g., content repository 290*a*-290*n*). In this case, the ER component 265 may receive metadata corresponding to content to be identified from the content repository 290. For example, for a song, the metadata may include one or more of a song title, an artist name(s), an album name, a record label, a release year, etc. In another example, for a movie, the metadata may include one or more of a movie title, one or more actor names, one or more character names, a director name(s), a producer name(s), a release year, etc. In yet another example, for a TV show, the metadata may include one or more of a show title, an episode number, a season number, one or more actor names, one or more character names, a director name(s), a producer name(s), an airdate, etc. In yet another example, for a news briefings, the metadata may include one or more of a title/headline, a location to which the news relates, an airdate/publication date, one or more person names, etc. In yet another embodiment, for a recipe, the metadata may include a recipe title, one or more ingredients, an author name, and/or other information.

In some embodiments, the ER component 265 may use a comparison process to classify (i.e., score) how closely a database entry/content entry compares to the metadata. The ER component 265 may output data representing one or more entity identifiers corresponding to content matching/similar to the metadata. In a non-limiting example, the ER component 265 may process the following metadata corresponding to a song: {Artist Name: [Artist]; Song Title: [Title]; Album Name: [Album]}, and may perform ER processing to identify a list of songs, from the content repository 290, that correspond to/match/are similar to the song identified by the metadata. In identifying the list of songs, the ER component 265 may determine that the songs have the same/similar artist name, the same/similar title, the same/similar album name, and/or the same/similar other information represented in the metadata.

In some embodiments, the ER component 265 may output an N-best list of entity identifiers, where each entity identifier may be associated with a confidence score, and the N-best list may be ranked based on the confidence scores.

As described herein, in some embodiments, the system(s) 120 may use the ER component 265 to determine potential content, from one or more content repositories 290 that the recipient user 7 has access to, matching/similar to the content shared with the recipient user 7.

In some embodiments, the system(s) 120 and the ER component 265 may access the content repository 290 via the skill 225. One or more skills 225 may correspond to content provider skills, such as music provider skills, video provider skills, movie provider skills, TV show provider skills, recipe provider skills, news provider skills, etc. A content provider skill 225 may be associated with a content repository 290 storing content accessible via that content provider skill. In some embodiments, the content repository 290 may include database entries about specific skills available on a specific device, either indexed by a device ID, a user profile ID, a user account ID, or some other indicator.

The system(s) 120 may also include a notification component 285. The notification component 285 may be configured to send a notification and related data to a device 110. In some embodiments, the notification component 285 may receive data indicating that the sender user 5 shared content with the recipient user 7, and may generate data (e.g., text data or token data) representing a notification that the sender user 5 shared content. The notification component 285 may also determine when and how the notification is to be presented/outputted to the recipient user 7. Depending on the capabilities and settings of the recipient device 110*b*, the notification may be outputted in different ways. For example, the notification component 285 may output the notification as a pop-up message displayed at the recipient device 110*b*, may cause the recipient device 110*b* to output a sound/chime, may cause the recipient device 110*b* to output a visual indication (e.g., a light ring, a blinking light, etc.), and other methods of output. In some embodiments, the notification may be a SMS message, a MMS message, a text message, an email, a voice message, or other type of message informing the recipient user 5 that the sender user 5 shared a song. In some embodiments, the notification component 285 may determine to send the notification data to the recipient device 110*b* immediately after or soon after the sender user 5 requests the system to send content to the recipient user 7. In some embodiments, the notification component 285 may wait to send the notification data to the recipient device 110*b*, for example, the notification may be sent when the recipient user's 7 presence is detected at the recipient device 110*b*, when the recipient user 7 interacts with the recipient device 110b, when the recipient user 7 finishes a presently active interaction/session with device 110b, and when the recipient user 7 requests output of notification(s) for the recipient's user profile. In some embodiments, the notification component 285 may send the notification data to the recipient device 110b to be output as injected content or supplementary content during an interaction between the recipient user 7 and the recipient device 110b, for example, the recipient device 110b may be outputting content in response to a request from the recipient user 7, and after the content is outputted or before the requested content is outputted, the notification component 285 may send the notification to the recipient device 110b. The notification component 285 may determine to output the notification as a displayed text or synthesized speech. The notification component 285 may send data representing the notification to the TTS component 280 to determine synthesized speech representing the notification. The notification component 285 may keep track of when the notification is presented to the recipient user 7, and when the recipient user 7 views/accesses the notification.

Figure 3:
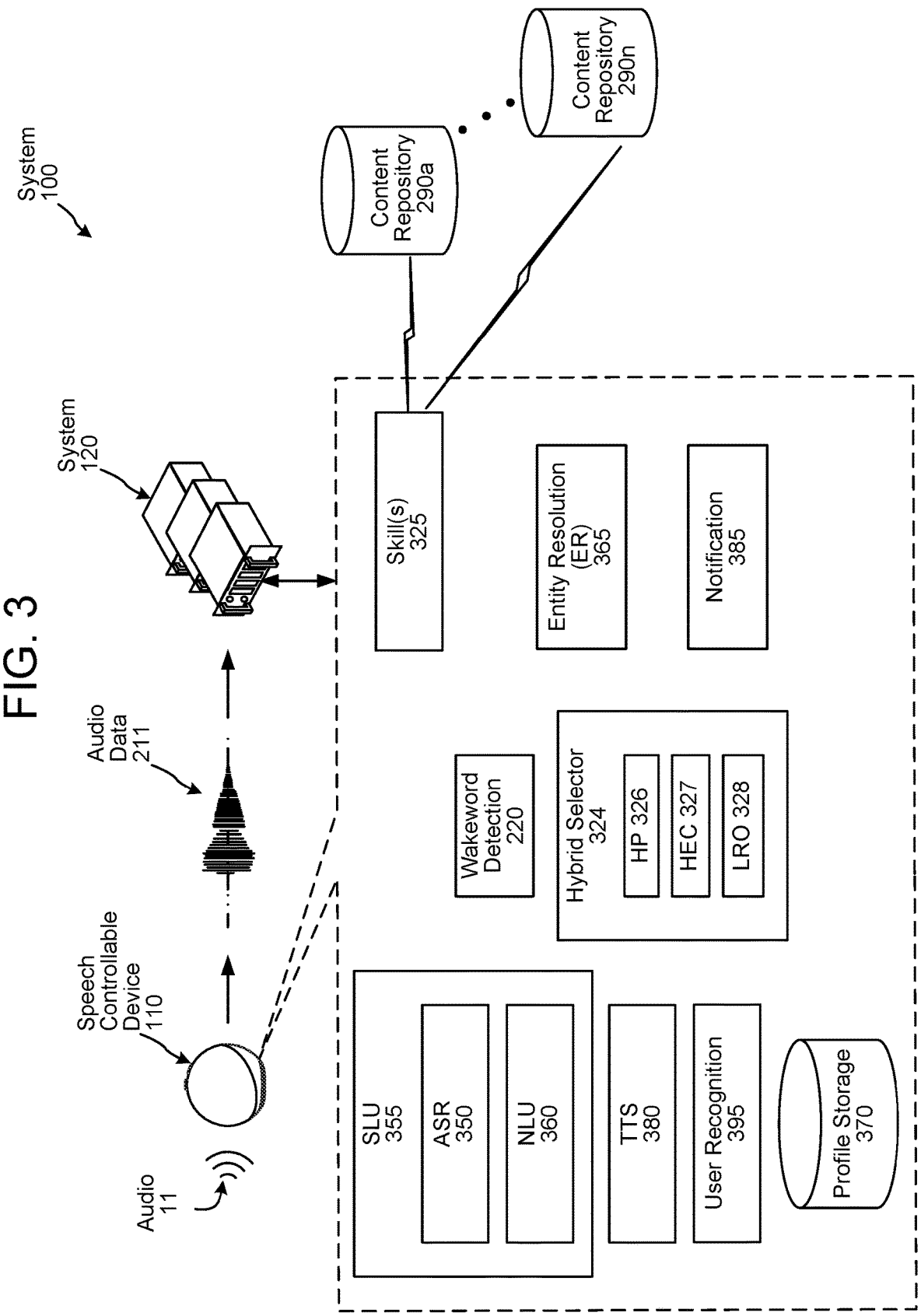
FIG. 3 is a conceptual diagram of components of a device, according to embodiments of the present disclosure.

The foregoing describes illustrative components and processing of the system(s) 120. The following describes illustrative components and processing of the speech controllable device 110. As illustrated in FIG. 3, in at least some embodiments, the system 120 may receive the audio data 211 from the speech controllable device 110, to recognize speech corresponding to a spoken input in the received audio data 211, and to perform functions in response to the recognized speech. In at least some embodiments, these functions involve sending directives (e.g., commands), from the system 120 to the speech controllable device 110 (and/or other devices 110) to cause the speech controllable device 110 to perform an action, such as output an audible response to the spoken input via a loudspeaker(s), and/or control secondary devices in the environment by sending a control command to the secondary devices.

Thus, when the speech controllable device 110 is able to communicate with the system 120 over the network(s) 199, some or all of the functions capable of being performed by the system 120 may be performed by sending one or more directives over the network(s) 199 to the speech controllable device 110, which, in turn, may process the directive(s) and perform one or more corresponding actions. For example, the system 120, using a remote directive that is included in response data (e.g., a remote response), may instruct the speech controllable device 110 to output an audible response (e.g., using TTS processing performed by an on-device TTS component 380) to a user's question via a loudspeaker(s) of (or otherwise associated with) the speech controllable device 110, to output content (e.g., music) via the loudspeaker(s) of (or otherwise associated with) the speech controllable device 110, to display content on a display of (or otherwise associated with) the speech controllable device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 2, the speech controllable device 110 may include a wakeword detection component 220 configured to compare the audio data 211 to stored models used to detect a wakeword (e.g., "Alexa") that indicates to the speech controllable device 110 that the audio data 211 is to be processed for determining NLU output data (e.g., slot data that corresponds to a named entity, label data, and/or intent data, etc.). In at least some embodiments, a hybrid selector 324, of the speech controllable device 110, may send the audio data 211 to the wakeword detection component 220. If the wakeword detection component 220 detects a wakeword in the audio data 211, the wakeword detection component 220 may send an indication of such detection to the hybrid selector 324. In response to receiving the indication, the hybrid selector 324 may send the audio data 211 to the system 120 and/or an on-device ASR component 350. The wakeword detection component 220 may also send an indication, to the hybrid selector 324, representing a wakeword was not detected. In response to receiving such an indication, the hybrid selector 324 may refrain from sending the audio data 211 to the system 120, and may prevent the ASR component 350 from further processing the audio data 211. In this situation, the audio data 211 can be discarded.

The speech controllable device 110 may conduct its own speech processing using on-device language processing components, such as an SLU component 355 (the ASR component 350 and an NLU 360), similar to the manner discussed above with respect to the SLU component 255 (or ASR component 250 and the NLU component 260) of the system 120. The speech controllable device 110 may also internally include, or otherwise have access to, other components such as one or more skills 325 capable of executing commands based on NLU output data or other results determined by the speech controllable device 110/system 120, a user recognition component 395 (configured to process in a similar manner to that discussed above with respect to the user recognition component 295 of the system 120), profile storage 370 (configured to store similar profile data to that discussed above with respect to the profile storage 270 of the system 120), and other components. In at least some embodiments, the profile storage 370 may only store profile data for a user or group of users specifically associated with the speech controllable device 110.

In at least some embodiments, the on-device language processing components may not have the same capabilities as the language processing components of the system 120. For example, the on-device language processing components may be configured to handle only a subset of the natural language inputs that may be handled by the system 120. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the speech controllable device 110 attempts to process a natural language input for which the on-device language processing components are not necessarily best suited, the language processing results determined by the speech controllable device 110 may indicate a low confidence or other metric indicating that the processing by the speech controllable device 110 may not be as accurate as the processing done by the system 120.

The hybrid selector 324, of the speech controllable device 110, may include a hybrid proxy (HP) 326 configured to proxy traffic to/from the system 120. For example, the HP 326 may be configured to send messages to/from a hybrid execution controller (HEC) 327 of the hybrid selector 324.

For example, command/directive data received from the system 120 can be sent to the HEC 327 using the HP 326. The HP 326 may also be configured to allow the audio data 211 to pass to the system 120 while also receiving (e.g., intercepting) this audio data 211 and sending the audio data 211 to the HEC 327.

In at least some embodiments, the hybrid selector 324 may further include a local request orchestrator (LRO) 328 configured to notify the ASR component 350 about the availability of new audio data 211 that represents user speech, and to otherwise initiate the operations of on-device language processing when new audio data 211 becomes available. In general, the hybrid selector 324 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the speech controllable device 110 receives directive data from the system 120 and chooses to use that remotely-determined directive data.

Thus, when the audio data 211 is received, the HP 326 may allow the audio data 211 to pass through to the system 120 and the HP 326 may also input the audio data 211 to the on-device ASR component 350 by routing the audio data 211 through the HEC 327 of the hybrid selector 324, whereby the LRO 328 notifies the ASR component 350 of the audio data 211. At this point, the hybrid selector 324 may wait for response data from either or both of the system 120 or the on-device language processing components. However, the disclosure is not limited thereto, and in some examples the hybrid selector 324 may send the audio data 211 only to the on-device ASR component 350 without departing from the disclosure. For example, the speech controllable device 110 may process the audio data 211 on-device without sending the audio data 211 to the system 120.

The on-device ASR component 350 is configured to receive the audio data 211 from the hybrid selector 324, and to recognize speech in the audio data 211, and the on-device NLU component 360 is configured to determine a user intent from the recognized speech, and to determine how to act on the user intent by generating NLU output data which may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic API call with a same logical operation as a remotely-determined directive. In other words, a device-determined directive may mimic a remotely-determined directive by using a same, or a similar, format as the remotely-determined directive.

A NLU hypothesis (output by the NLU component 360) may be selected as usable to respond to a natural language input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language input, to use directive data received from the system 120, assuming a remote response is even received (e.g., when the speech controllable device 110 is able to access the system 120 over the network(s) 199), or to determine output audio requesting additional information from the user 5.

The speech controllable device 110 and/or the system 120 may associate a unique identifier with each natural language input. The speech controllable device 110 may include the unique identifier when sending the audio data 211 to the system 120, and the response data from the system 120 may include the unique identifier to identify which natural language input the response data corresponds.

In at least some embodiments, the device 110 may include, or be configured to use, one or more skills 325 that may work similarly to the skill(s) 225. The skill(s) 325 may correspond to one or more domains that are used in order to determine how to act on a spoken input in a particular way, such as by outputting a directive that corresponds to the determined intent, and which can be processed to implement the desired operation. The skill(s) 325 installed on (or in communication with) the device 110 may include, without limitation, a content provider skill, a smart home skill (or smart home domain) and/or a device control skill (or device control domain) to execute in response to spoken inputs corresponding to an intent to control a second device(s) in an environment, a music skill (or music domain) to execute in response to spoken inputs corresponding to a intent to play music, a navigation skill (or a navigation domain) to execute in response to spoken input corresponding to an intent to get directions, a shopping skill (or shopping domain) to execute in response to spoken inputs corresponding to an intent to buy an item from an electronic marketplace, and/or the like.

In some embodiments, the device 110 may include an ER component 365 that may be configured to perform similar functionalities described in relation to the ER component 265. In some embodiments, the device 110 may include a notification component 385 that may be configured to perform similar functionalities described in relation to the notification component 285.

In at least some embodiments, some or all of the functionality, described herein as being provided by the system 120, may instead by provided by the device 110.

Figure 4:
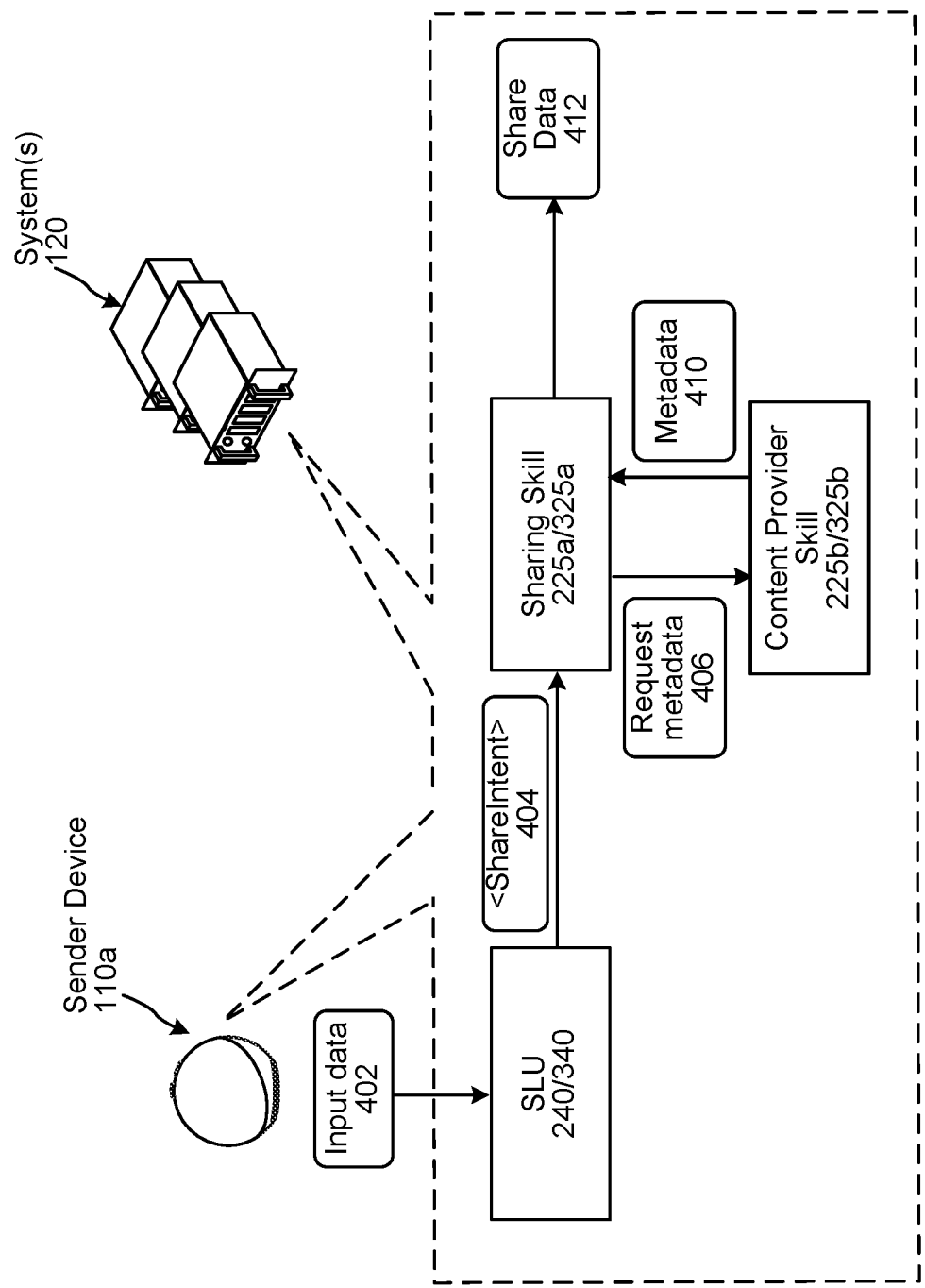
FIG. 4 is a conceptual diagram of components of a system and/or device for processing a request to share content, according to embodiments of the present disclosure.

FIG. 4 illustrates a system for processing a request from a sender user to share content with a recipient user. The sender user 5 may provide input data 402 via the sender device 110a, where the input data 402 represents a request to share content with the recipient user 7. The input data 402 may be audio data representing a spoken natural language input, data representing an input provided via a peripheral(s) (e.g., touchscreen interface, mouse, keyboard, etc.) of the sender device 110a, image data representing a gesture(s) captured by a camera(s) of the sender device 110a, etc. The input data 402 may be processed by the SLU component 240/340 to determine that the input data 402 represents a request to share content with the recipient user 7. The SLU component 240/340 may invoke a sharing skill 225a/325a and may send intent data representing <ShareIntent> 404 to the sharing skill 225a/325a.

The system(s) 120 or the sender device 110a may include the sharing skill 225a/325a that may be responsible for processing requests to share content. The sharing skill 225a/325a may determine which content the sender user 5 wants to share. In some embodiments, the sharing skill 225*a*/325*a* may determine that the content to be shared is the content that is being presently displayed, played or otherwise outputted by the sender device 110*a*. The sharing skill 225*a*/325*a* may, in some embodiments, determine a content provider skill 225*b*/325*b* that is outputting the content to be shared. The sharing skill 225*a*/325*a* may send a request 406 for metadata, corresponding to the content that is presently being outputted by the sender device 110*a*, to the content provider skill 225*b*/325*b*. The content provider skill 225*b*/325*b* may send metadata 410 corresponding to the content to be shared. The metadata 410 may include information identifying the content. In some embodiments, the metadata 410 may include a content identifier used by the content provider skill 225*b*/325*b* to identify the content within the content repository 290 associated with the content provider skill 225*b*/325*b*.

The sharing skill 225*a*/325*a* may generate and output share data 412, where the share data 412 may include the metadata, data identifying the recipient user 7, data identifying the sender user 5, and other data related to the sender user 5. In some embodiments, the share data 412 may be associated with a communications session identifier to track the request to share from the sender user 5, the content to be shared, when the recipient user 7 accesses the shared content, any feedback/reaction provided by the recipient user 7 in response to the shared content, and other data/interactions with respect to the instant request to share content. In some embodiments, the notification component 285/385 may use the share data 412 to generate and send a notification to the recipient device 110*b*.

Figure 5:
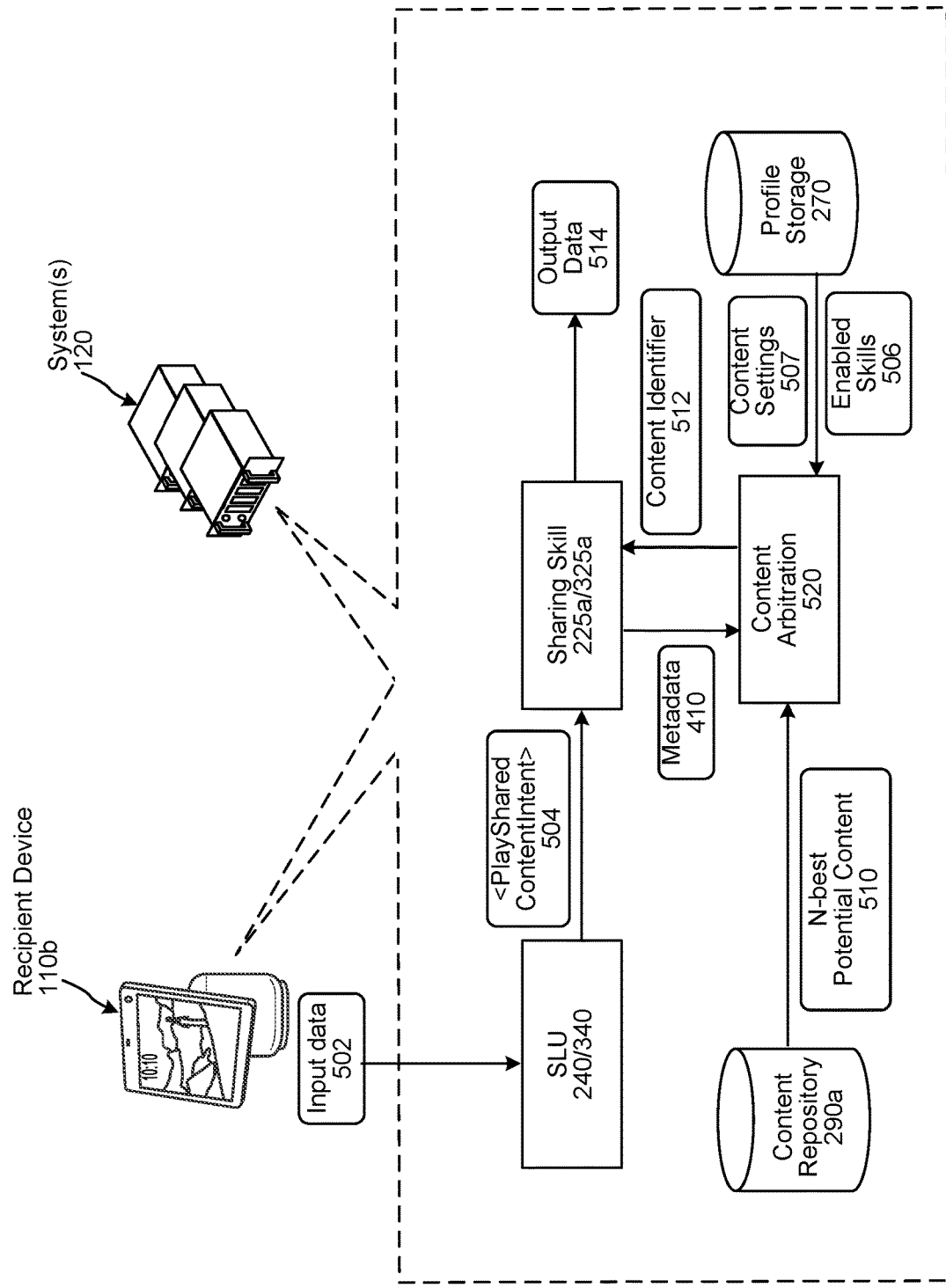
FIG. 5 is a conceptual diagram of components of a system and/or device for processing a request to output shared content, according to embodiments of the present disclosure.

FIG. 5 illustrates a system for processing a request from a recipient user to output shared content. The recipient user 7 may provide input data 502 via the recipient device 110*b*, where the input data 502 represents a request to output the content shared by the sender 5. The input data 502 may be audio data representing a spoken natural language input, data representing an input provided via a peripheral(s) (e.g., touchscreen interface, mouse, keyboard, etc.) of the recipient device 110*b*, image data representing a gesture(s) captured by a camera(s) of the recipient device 110*b*, etc. The input data 502 may be processed by the SLU component 240/340 to determine that the input data 502 represents a request to output the shared content. The SLU component 240/340 may invoke the sharing skill 225*a*/325*a* and may send intent data representing <PlaySharedContentIntent> 504 to the sharing skill 225*a*/325*a*, which may also be responsible for processing requests to output shared content.

In some embodiments, the recipient user 7 may request output of shared content in response to a notification received at the recipient device 110*b*. The sharing skill 225*a*/325*a* may identify the communications identifier associated with the notification. Using the communications identifier, the sharing skill 225*a*/325*a* may retrieve the metadata 410 corresponding to the shared content. The sharing skill 225*a*/325*a* may send the metadata 410 to a content arbitration component 520, which may be included at the system(s) 120 or the recipient device 110*b*.

The content arbitration component 520 may be configured to output content corresponding to the shared content based on which content repositories the recipient user 7 has access to. The content arbitration component 520 may receive enabled skills data 506 associated with the user (recipient) profile identifier associated with the recipient user 7 and stored in the profile storage 270. The enabled skills data 506 may represent one or more content provider skill identifiers associated with one or more content provider skills that the recipient user 7 has access to. The recipient user 7 may subscribe to one or more content provider skills. The recipient user 7 may have enabled one or more content provider skills for the recipient device 110*b* or a user profile for the recipient user 7. In some embodiments, the enabled skills data 506 may represent an access level for each of the content provider skills that the recipient user 7 is subscribed to/enabled to access.

Using the enabled skills data 506, the content arbitration component 520 may determine one or more content repositories 290 that the recipient user 7 has access to. Using the determined content repositories, for example, at least the content repository 290*a*, and the metadata 410, the content arbitration component 520 may perform ER processing to determine a N-best list of potential content 510 corresponding to the shared content. The N-best list of potential content 510 may be referred to as ER output data. The N-best list of potential content 510 may include a respective confidence score associated with each potential content.

In some embodiments, the content arbitration component 520 or another component may send a request to the content provider skill identified in the enabled skills data 506, where the request may include the metadata 410 and the user (recipient) profile identifier for the recipient user 7. The request from the content arbitration component 520 may indicate to the content provider skill to identify potential content(s), from the pieces of contents that are accessible by the user (recipient) profile identifier, matching/similar to/substantially similar to the content represented by the metadata 410. In other embodiments, the content arbitration component 520 or another component may send a request to the content provider skill identified in the enabled skills data 506, where the request may include the user (recipient) profile identifier for the recipient user 7, and the content provider skill, in response to the request, may provide access to the content repository 290*a* that may include pieces of content that are accessible by the recipient user 7.

The content arbitration component 520 may also receive content settings data 507, from the profile storage 270, associated with the user (recipient) profile identifier for the recipient user 7. The content settings data 507 may indicate the recipient user's 7 preferences for which content is outputted. The content settings data 507 may correspond to the recipient user profile. The content settings data 507 may correspond to a user account of the recipient user 7, where multiple users (e.g., of the same household, same office, same organization, etc.) may be included in the user account and the content settings may be applied to all users of the user account. The content settings data 507 may correspond to the recipient device 110*b* and may be applied to any content that is outputted using the recipient device 110*b* (regardless of which user requested output of the content). In some embodiments, the content settings data 507 may indicate that an explicit content filter is on (i.e. only non-explicit/clean content is to be outputted) for the recipient user profile, the recipient device 110*b* and/or the user account of the recipient user 7. In some embodiments, the content settings data 507 may indicate a preferred/default content provider skill for recipient user profile, the recipient device 110*b* and/or the user account of the recipient user 7. In some embodiments, the content settings data 507 may indicate one or more content provider skills that the recipient user 7 does not want to receive content from. For example, the recipient user 7 may not want to receive news briefing from a first news provider skill. In some embodiments, the content settings data 507 may indicate that virus scanned content is to be outputted (i.e., do not output content that has not been scanned/processed for potentially malicious content/executables). In some embodiments, the content settings data 507 may indicate that fact-checked content is to be outputted (i.e., do not output content that has not been verified using one or more sources/knowledge bases/other fact checking systems). In some embodiments, the content settings data 507 may indicate one or more users (e.g. the sender user 5) that are able to share particular content with the recipient user 7. For example, the content settings data 507 may indicate that songs shared by a first sender user 5 should be outputted, recipes shared by a second sender user 5 should be outputted, news briefings shared by the first sender user 5 should not be outputted, etc. In some embodiments, the content settings data 507 may include one or more filter tags for a particular type of content, where the filter tag may indicate what kind of content for that type of content the recipient user 7 wants output or not output, and may also indicate when the particular kind of content is to be outputted. For example, the content settings data 507 may include a first filter tag for recipes indicating that only vegetarian recipes are to be outputted. In another example, the content settings data 507 may include a second filter tag for recipes indicating that no alcohol recipes are to be outputted during a first time period (e.g., corresponding to a religious holiday/event). In yet another example, the content settings data 507 may include a third filter tag for recipes indicating that high carb recipes are only to be outputted on a particular day (e.g., Fridays). In yet another example, the content settings data 507 may include filter tags for recipes based on a diet preference of the recipient user 7, health/medical based diet restrictions/preferences of the recipient user 7, etc. that may be set by the recipient user 7 within the user profile.

The content arbitration component 520 may select potential content from the N-best list 510, and may send a content identifier 512, associated with the selected potential content, to the sharing skill 225a/325a. The content identifier 512 may identify the selected potential content in the content repository 290a. The content arbitration component 520, in some embodiments, may select the highest scored/best potential content from the N-best list 510. In some embodiments, the content arbitration component 520 may select the potential content from the N-best list 510 based on the content settings data 507, as described in relation to FIG. 7.

The sharing skill 225a/325a may determine output data 514 using the content identifier 512, where the output data 514 represents the potential content corresponding to the shared content. For example, the output data 514 may be audio data representing the shared song. In another example, the output data 514 may be video data representing the shared movie, TV show or other type of video. In yet another example, the output data 514 may be audio data representing the shared news briefing or shared recipe. The output data 514 may be sent by the system(s) 120 to the recipient device 110b for output. In other embodiments, the recipient device 110b may output the output data 514 in response to processing the request (represented by the input data 502) to output the shared content.

Figure 6:
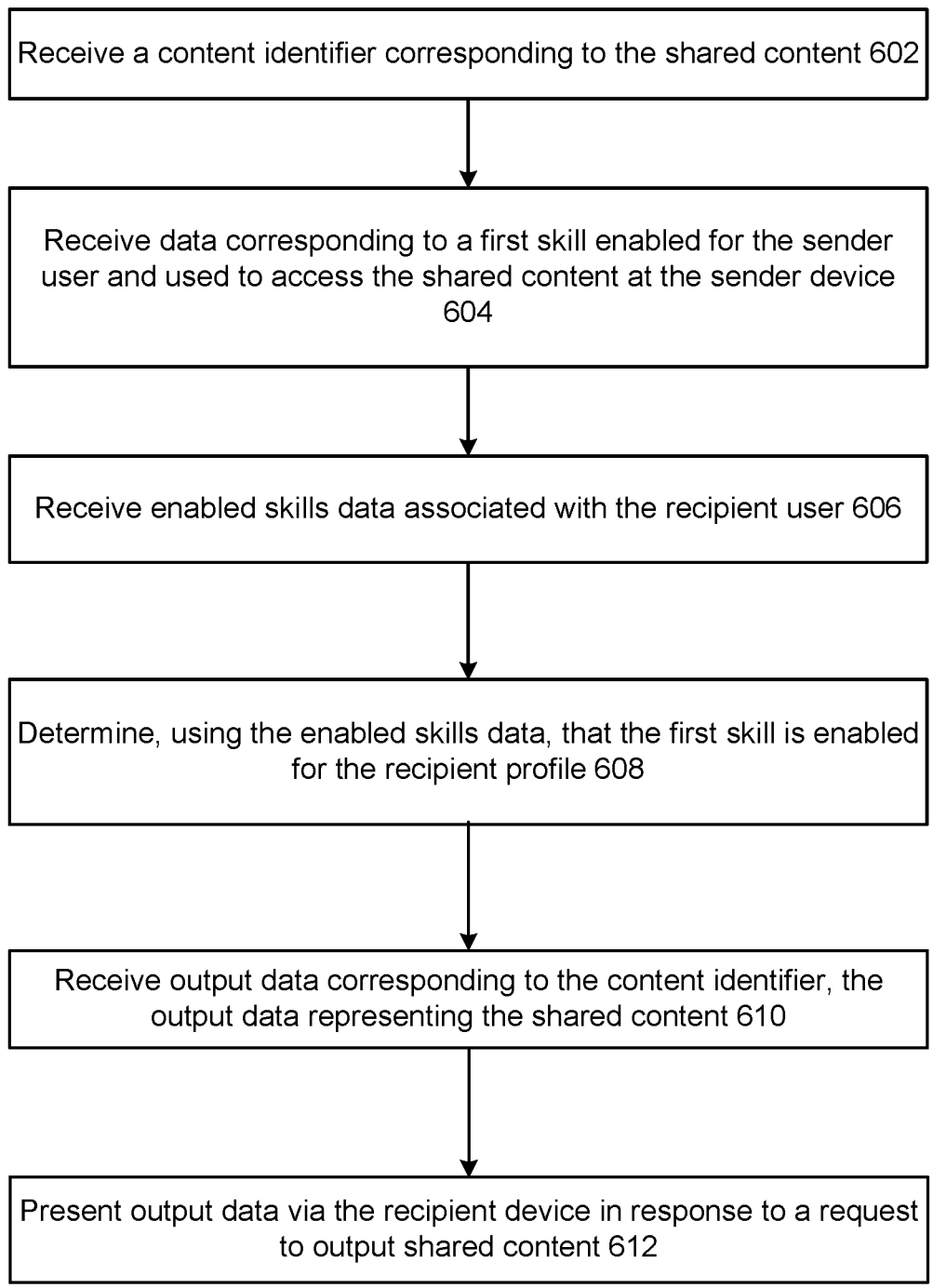
FIG. 6 is a process flow diagram illustrating a process that may be performed by a content arbitration component, according to embodiments of the present disclosure.

FIG. 6 illustrates an example process performed by the content arbitration component 520 to determine whether the recipient user 7 is subscribed to the same content provider skill (at the same access level) as the sender user 5, in which case, the content arbitration component 520 uses the content identifier associated with the shared content to output data representing the shared content at the recipient device 110b (rather than performing ER processing to determine potential content corresponding to the shared content). The content arbitration component may receive (602) a content identifier corresponding to the shared content. The content identifier may be included in the metadata received from a content provider skill 225b/325b), or may be provided separately from the content provider skill 225b/325b. The content arbitration component 520 may receive (604) data corresponding to a first skill enabled for the sender user 5 and used to access the shared content at the sender device 110a. The data may include at least a content provider identifier associated with the content provider skill used to access the shared content at the sender device 110a. The data, in some embodiments, may also include a name of the content provider skill 225b/325b. The data, in some embodiments, may also include an access level (e.g., gold, platinum, silver, premium, unlimited, limited, paid, free, etc.) enabled for the sender user 5. The content arbitration component 520 may receive (608) enabled skills data (e.g., 506) associated with the recipient user 7. The enabled skills data may include at least one content provider identifier associated with at least one content provider skill enabled for the recipient user 7. The enabled skills data may also include, in some embodiments, an access level, for each content provider skill, that is enabled for the recipient user 7.

The content arbitration component 520 may determine (608), using the enabled skills data, that the first skill (the same content provider skill used to access the shared content at the sender device 110a) is enabled for the recipient device 110b. In some embodiments, the content arbitration component 520 may determine that the sender user 5 and the recipient user 7 have the same access level within the first skill. In this case, the content arbitration component 520 may use the content identifier (received with the metadata for the shared content) to retrieve output data (e.g., the output data 514). The content arbitration component 520 may receive (610) output data corresponding to the content identifier, where the output data represents the shared content. In this case, the content arbitration component 520 does not perform ER processing when the sender user 5 and the recipient user 7 are subscribed to the same content provider skill (at the same access level). The content arbitration component 520 may cause presentation (612) of the output data via the recipient device 110b in response to the request to output the shared content.

Figure 7:
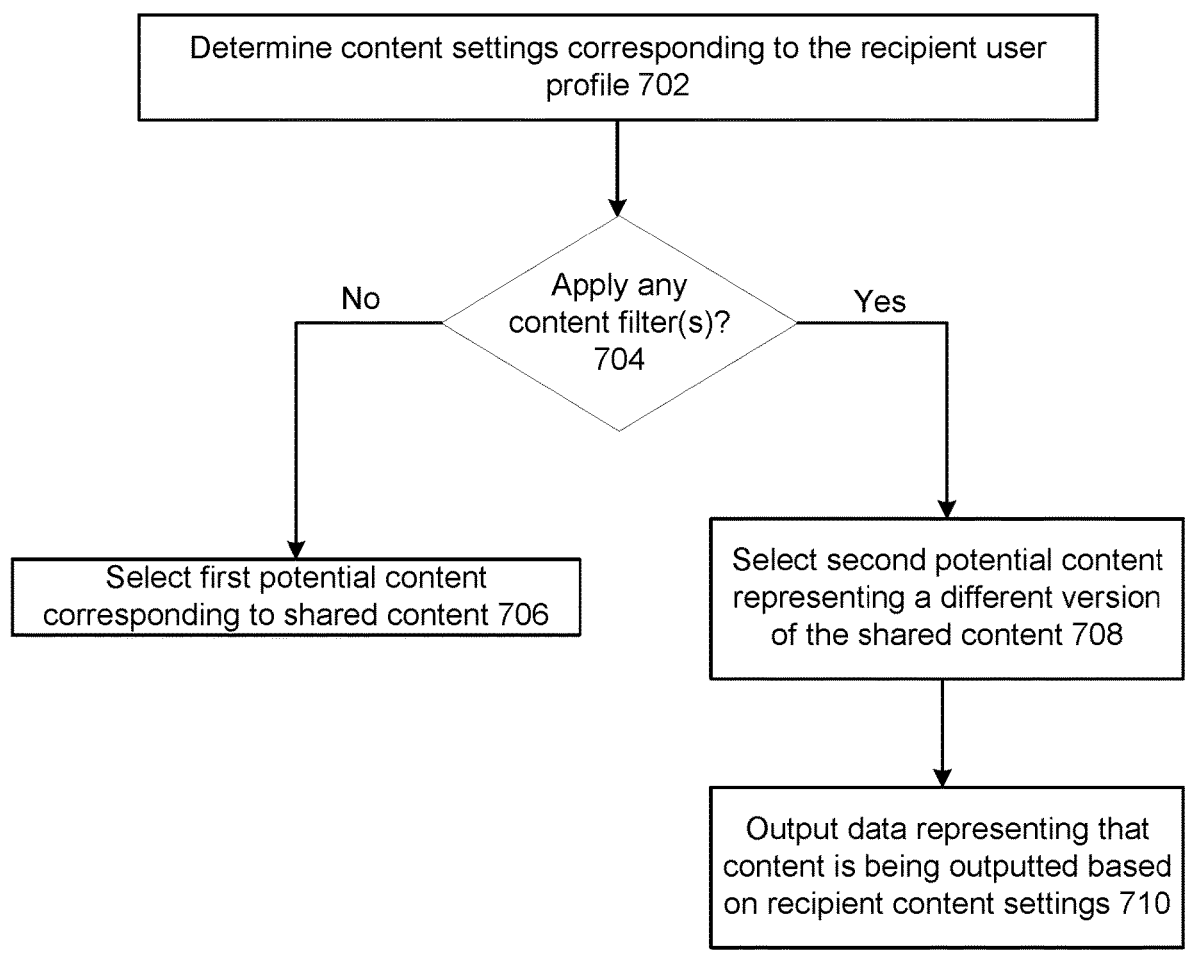
FIG. 7 is a process flow diagram illustrating a process that may be performed by the content arbitration component, according to embodiments of the present disclosure.

FIG. 7 illustrates an example process that may be performed by the content arbitration component 520 to select potential content based on content settings corresponding to the recipient user 7. The content arbitration component 520 may determine (702) content settings corresponding to the recipient user profile of the recipient user 7. In some embodiments, the content arbitration component 520 may use the content settings data 507 to determine the content settings. The content settings may be associated with the recipient device 110b, a user profile of the recipient user 7, and/or the user account of the recipient user 7. In some cases, some devices, based on a device type or device configuration, may have an active content filter (e.g., an explicit content filter) that indicates the device is not to output a particular type of content. The content arbitration component 520 may determine the content settings for a device using a device identifier, a device type identifier, a device profile, and other information related to the device. In some embodiments, a device type identifier or device identifier may indicate that the device is configured for child-use, and may have an active explicit content filter. In some cases, a user may turn on an explicit content filter in the profile settings indicating that explicit content is not to be outputted for the user associated with the user profile. In some cases, a user may turn on an explicit content filter in the user account settings indicating that explicit content is not to be outputted for any user associated with the user account. A user account may be associated with multiple users, for example, users of a household, so that the multiple users have access to the same device(s) within the household. The content arbitration component 520 may also determine to filter output of content based on other types of filters described in relation to content settings data 507 of FIG. 5. For example, such filters may include, but are not limited to, output of a particular type of content from particular sender users, output of particular kind of content for a particular content type, no output from particular content provider skills, output of virus scanned content, output of fact checked content, output from preferred/default content provider skill, etc.

The content arbitration component 520 may determine (704) whether any content filter(s) is to be applied based on the received content settings. If no content filters are to be applied, then the content arbitration component 520 may select (706) a first potential content from the N-best list 510 corresponding to the shared content (for example, without any regard to whether the first potential content includes explicit content or not). If one or more content filters are to be applied, then the content arbitration component 520 may select (708) second potential content representing a different version of the shared content. The second potential content may be included in the N-best list 510, and the content arbitration component 520 may apply the content filters to the N-best list 510. In some embodiments, the N-best list 510 may not include versions of content that satisfy the content settings (for example, the N-best list may not include a non-explicit version of the shared content), in which case, the content arbitration component 520 may select the first potential content from the N-best list 510, query the content repository 290*a* to find a version of the first potential content that satisfies the content settings, and use that version (e.g., non-explicit version of the first potential content) to receive the output data 514 to output content in response to the recipient user 7 request to output the shared content.

The content arbitration component 520 or another component may output (710) data representing that content is being outputted based on recipient content settings. In this manner, in some embodiments, the system may inform the recipient user 7 that content different than the shared content is being outputted based on the content settings. For example, the system may output data (e.g., text data displayed at the recipient device 110*b* or synthesized speech) representing "The content is being outputted based on your explicit content settings" or "The [sender] shared explicit content. A clean version of the content is available for output." In another example, the system may output data representing "The content is being outputted based on your recipe settings," "The [sender] shared a non-vegetarian recipe. A vegetarian version of the recipe is available for output" or "A vegetarian version of the shared recipe is being outputted."

In some embodiments, if the content arbitration component 510 is unable to find a version of content, that satisfies the content settings, to output in response to the request to output shared content, then the content arbitration content 520 may output data (e.g., display text message or output synthesized speech) at the recipient device 110*b* stating that the shared content cannot be output based on the content settings associated with the recipient user 7 (the recipient device 110*b*). For example, the data outputted may represent "This device cannot output explicit content" or "The shared content includes explicit content." In another example, the data outputted may represent "The shared recipe is non-vegetarian. I cannot find a vegetarian version. Do you want me to still output the shared recipe?"

Figure 8:
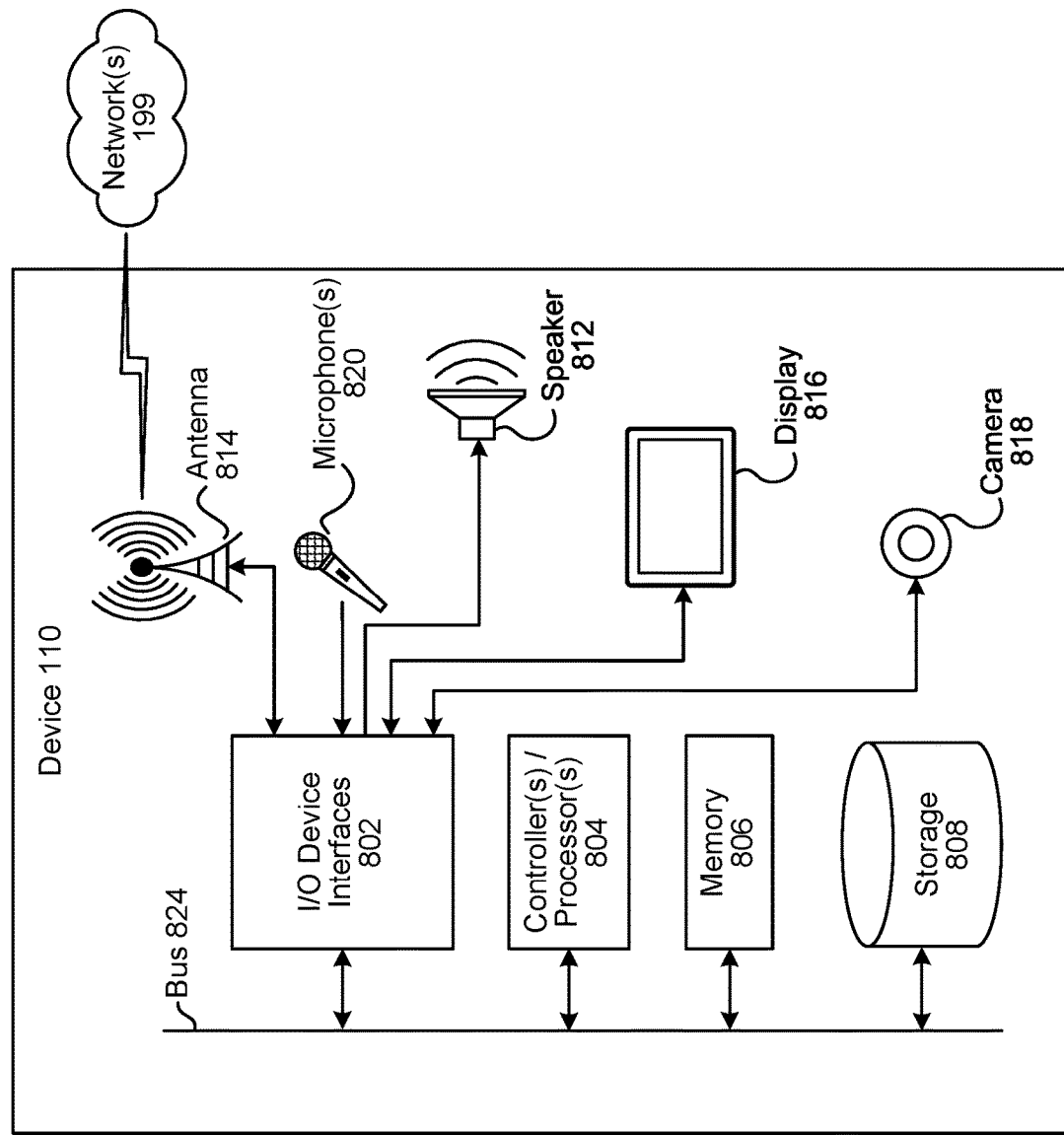
FIG. 8 is a block diagram conceptually illustrating example components of a device, according to embodiments of the present disclosure.
Figure 9:
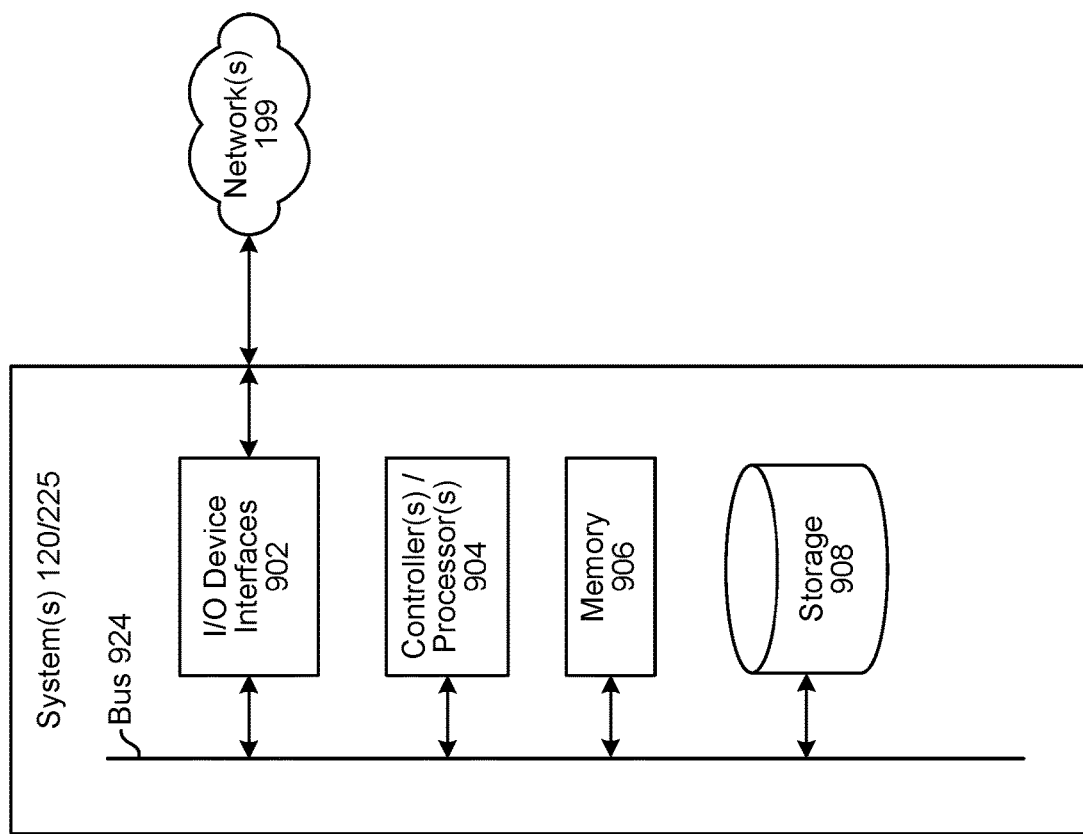
FIG. 9 is a block diagram conceptually illustrating example components of a system, according to embodiments of the present disclosure.

FIG. 8 is a block diagram conceptually illustrating a device 110 that may be used with the system 120. FIG. 9 is a block diagram conceptually illustrating example components of a remote device, such as the system 120 or a skill 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/225) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the system 100 of the present disclosure, such as one or more systems 120 for performing ASR processing, one or more systems 120 for performing NLU processing, one or more skill 225, one or more skills 225, etc. In operation, each of these systems may include computer-readable and computer-executable instructions that reside on the respective device (120/225), as will be discussed further below.

Each of these devices (110/120/225) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/225) may also include a data storage component (808/908) for storing data and controller/processor-executable instructions. Each data storage component (808/908) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (802/902).

Computer instructions for operating each device (110/120/225) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software. In some embodiments, the storage (808) of the device 110 may be a content repository that the system(s) 120 may use to determine contents that are accessible by the recipient user 7.

Each device (110/120/225) includes input/output device interfaces (802/902). A variety of components may be connected through the input/output device interfaces (802/902), as will be discussed further below. Additionally, each device (110/120/225) may include an address/data bus (824/924) for conveying data among components of the respective device. Each component within a device (110/120/225) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device 110, the system 120, and/or the skill 225 may include their own dedicated processors, memory, and/or storage. Alternatively, one or more of the components of the device 110, the system 120, and/or the skill 225 may utilize the I/O interfaces (802/902), processor(s) (804/904), memory (806/906), and/or storage (808/908) of the device 110, the system 120, or the skill 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and the skill 225, as described herein, are illustrative, and may be located as a stand-alone device or may be included, in whole or in part, as a component of a larger device or system.

Figure 10:
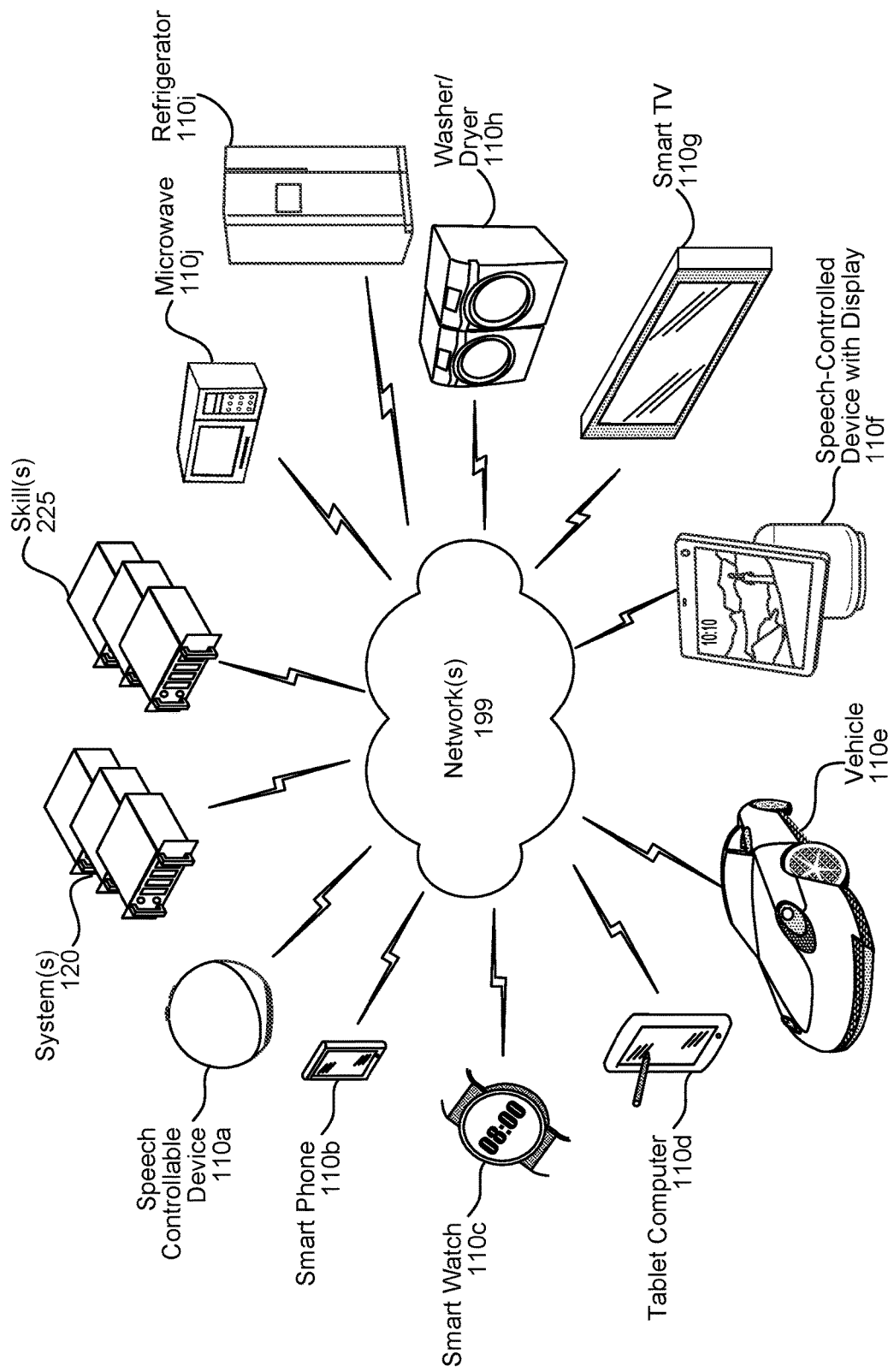
FIG. 10 illustrates an example of a computer network for use with the overall system, according to embodiments of the present disclosure.

As illustrated in FIG. 10, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the skill 225, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving first input data indicating a first identifier of first content being sent from a first sender profile to a first recipient profile;
   receiving, from a first device associated with the first recipient profile, second input data;
   determining that the second input data is a first request to generate output corresponding to the first content;
   receiving first metadata corresponding to the first content;
   receiving first data corresponding to the first recipient profile, the first data including an identifier of a content provider application;
   determining, using the first data, that the content provider application is enabled for execution with respect to the first recipient profile; and
   in response to the first request and based on the content provider application being enabled for execution with respect to the first recipient profile:
      determining at least a first content repository corresponding to the content provider application,
      determining, using the first metadata, first content data of the first content repository,
      determining that the first content data corresponds to the first content,
      determining, using the first content data, first output data, and
      sending the first output data to the first device.

2. The computer-implemented method of claim 1, further comprising:
   receiving, from a second device associated with the first sender profile, third input data;
   processing the third input data to determine a second request to send the first content to the first recipient profile;
   determining the first metadata corresponding to the first content, the first metadata including data identifying the first content; and
   associating the first metadata with a communications identifier and the first recipient profile.

3. The computer-implemented method of claim 1, wherein:
   the first metadata includes a content identifier associated with the first content and a content provider identifier identifying the content provider application to send data representing the first content to the first device; and
   the content provider identifier is used to determine that the content provider application is enabled for execution with respect to the first recipient profile.

4. The computer-implemented method of claim 1, further comprising:
   receiving, from a third device, third input data representing a second request to output second content, the second content being sent by a second sender profile to a second recipient profile associated with the third device;
   receiving second metadata corresponding to the second content;
   determining at least a second content repository enabled for the second recipient profile;
   determining content settings associated with at least one of the third device, the second recipient profile, or a user account associated with the second recipient profile;
   performing entity resolution (ER) processing using the second metadata and the second content repository;
   determining at least second content data and third content data corresponding to the second content;
   based on the content settings, selecting the second content data for output;
   receiving second output data representing the second content data; and
   sending the second output data to the third device.

5. The computer-implemented method of claim 1, further comprising:
   receiving, from a third device, third input data representing a second request to output second content, the second content being sent by a second sender profile to a second recipient profile associated with the third device;
   receiving second metadata corresponding to the second content;
   determining, using the second metadata, that the second content is available via a second content repository;
   determining that the second content repository is disabled for the second recipient profile;
   determining the content provider application capable of outputting third content related to the second content;
   determining second output data including a representation of the content provider application and the third content; and
   sending the second output data to the third device.

6. The computer-implemented method of claim 1, further comprising:
   determining a second content repository enabled for the first recipient profile;
   performing ER processing using the first metadata and the second content repository;
   determining second content data corresponding to the first content;
   determining user account settings associated with the first recipient profile;
   determining device settings associated with the first device;
   determining location data associated with the first recipient profile; and
   selecting, from the first content data and the second content data, the first content data for output, wherein selection of the first content data is based on at least one the user account settings, the device settings, or the location data.

7. The computer-implemented method of claim 1, wherein receiving the first input data comprises receiving audio data representing a natural language input spoken by a user, and the method further comprises:
   determining, using the audio data, a user profile identifier corresponding to the user;
   determining that the user profile identifier corresponds to the first recipient profile; and determining the first content repository based on profile data associated with the user profile identifier.

8. The computer-implemented method of claim 1, further comprising:
   determining notification data in response to receiving the first request, the notification data representing that the first recipient profile requested the first content to be output; and
   in response to determining the content provider application is enabled for the first device, sending the notification data to the first device.

9. A computer-implemented method comprising:
   receiving, from a first device, first input audio data representing a first natural language input;
   processing the first input audio data to determine that the first natural language input requests a first song be shared with a first recipient profile;
   storing first metadata corresponding to the first song, the first metadata including at least a first song name;
   receiving, from a second device associated with the first recipient profile, first input data representing a first input;
   processing the first input data to determine that the first input requests the first song be output;
   determining at least a first music repository enabled for a first user profile associated with the first recipient profile;
   performing entity resolution (ER) processing using the first metadata and the first music repository to determine first ER output data including a first content identifier corresponding to a first potential song;
   based on the first ER output data, determining that the first potential song corresponds to the first song;
   receiving first output audio data corresponding to the first content identifier, the first output audio data representing the first potential song; and
   sending the first output audio data to the second device for output in response to the first input.

10. The computer-implemented method of claim 9, further comprising:
    receiving, from the first device, second input audio data representing a second natural language input;
    processing the second input audio data to determine that the second natural language input requests a second song be shared with a second recipient profile;
    determining second metadata corresponding to the second song, the second metadata including at least a second song name, a third content identifier corresponding to the second song, and a content provider identifier identifying a content provider skill to send data representing the second song to the first device;
    receiving, from a third device associated with the second recipient profile, second input data representing a second input;
    processing the second input data to determine that the second input requests the second song be output;
    determining, using the content provider identifier, that the content provider skill is enabled for the second recipient profile;
    receiving second output audio data corresponding to the third content identifier, the second output audio data representing the second song; and
    sending the second output audio data to the third device for output in response to the second input.

11. The computer-implemented method of claim 9, further comprising:
    receiving, from a third device, second input data representing a request to output a second song sent by the first device to a second recipient associated with the third device;
    receiving second metadata corresponding to the second song;
    determining a content repository enabled for the second recipient;
    determining explicit content settings associated with at least one of the third device, user profile data associated with the second recipient, or a user account associated with the second recipient;
    performing ER processing using the second metadata and the content repository;
    determining at least a second potential song and a third potential song corresponding to the second song; and
    based on the explicit content settings, selecting the second potential song for output, the second potential song representing a non-explicit version of the second song.

12. The computer-implemented method of claim 9, further comprising:
    determining notification data in response to receiving the first natural language input, the notification data representing that a sender user profile associated with the first device requested the first song be shared;
    prior to receiving the first input data, receiving, from the second device, data representing a music provider skill is active at the second device; and
    sending the notification data to the second device in response to the music provider skill being active.

13. A computing system, comprising:
    at least one processor; and
    at least one memory comprising instructions that, when executed by the at least one processor, cause the computing system to:
    receive first input data indicating a first identifier of first content being sent from a first sender profile to a first recipient profile;
    receive, from a first device associated with the first recipient profile, second input data;
    determine that the second input data is a first request to generate output corresponding to the first content;
    receive first metadata corresponding to the first content;
    receive first data corresponding to the first recipient profile, the first data including an identifier of a content provider application;
    determine, using the first data, that a content provider application is enabled for execution with respect to the first recipient profile; and
    in response to the first request and based on the content provider application being enabled for execution with respect to the first recipient profile:
      determine at least a first content repository corresponding to the content provider application,
      determine, using the first metadata, first content data of the first content repository,
      determine that the first content data corresponds to the first content,
      determine, using the first content data, first output data, and
      send the first output data to the first device.

14. The computing system of claim 13, wherein the at least one memory further comprises instructions that, when executed by the at least one processor, further cause the computing system to:
    receive, from a second device associated with the first sender profile, third input data;

process the third input data to determine a second request to send the first content to the first recipient profile;

determine the first metadata corresponding to the first content, the first metadata including data identifying the first content; and associate the first metadata with a communications identifier and the first recipient profile.

15. The computing system of claim 13, wherein the first metadata includes a content identifier associated with the first content and a content provider identifier identifying the content provider application to send data representing the first content to the first device; and the at least one memory further comprises instructions that, when executed by the at least one processor, further cause the computing system to use the content provider identifier to determine that the content provider application is enabled for execution with respect to the first recipient profile.

16. The computing system of claim 13, wherein the at least one memory further comprises instructions that, when executed by the at least one processor, further cause the computing system to:

receive, from a third device, third input data representing a second request to output second content, the second content being sent by a second sender profile to a second recipient profile associated with the third device;

receive second metadata corresponding to the second content;

determine at least a second content repository enabled for the second recipient profile;

determine content settings associated with at least one of the third device, the second recipient profile, or a user account associated with the second recipient profile;

perform entity resolution (ER) processing using the second metadata and the second content repository;

determine at least second content data and third content data corresponding to the second content;

based on the content settings, select the second content data for output;

receive second output data representing the second content data; and send the second output data to the third device.

17. The computing system of claim 13, wherein the at least one memory further comprises instructions that, when executed by the at least one processor, further cause the computing system to:

receive, from a third device, third input data representing a second request to output second content, the second content being sent by a second sender profile to a second recipient profile associated with the third device;

receive second metadata corresponding to the second content;

determine, using the second metadata, that the second content is available via a second content repository;

determine that the second content repository is disabled for the second recipient profile;

determine the content provider application capable of outputting third content related to the second content;

determine second output data including a representation of the content provider application and the third content; and send the second output data to the third device.

18. The computing system of claim 13, wherein the at least one memory further comprises instructions that, when executed by the at least one processor, further cause the computing system to:

determine a second content repository enabled for the first recipient profile;

perform ER processing using the first metadata and the second content repository;

determine second content data corresponding to the first content;

determine user account settings associated with the first recipient profile;

determine device settings associated with the first device;

determine location data associated with the first recipient profile; and select, from the first content data and the second content data, the first content data for output, wherein selection of the first content data is based on at least one the user account settings, the device settings, or the location data.

19. The computing system of claim 13, wherein the first input data comprises audio data representing a natural language input spoken by a user, and wherein the at least one memory further comprises instructions that, when executed by the at least one processor, further cause the computing system to:

determine, using the audio data, a user profile identifier corresponding to the user;

determine that the user profile identifier corresponds to the first recipient profile; and determine the first content repository based on profile data associated with the user profile identifier.

20. The computing system of claim 13, wherein the at least one memory further comprises instructions that, when executed by the at least one processor, further cause the computing system to:

determine notification data in response to receiving the first request, the notification data representing that the first recipient profile requested the first content to be output; and in response to determining the content provider application is enabled for the first device, send the notification data to the first device.

* * * * *